(12) United States Patent
Yamamoto et al.

(10) Patent No.: US 12,356,408 B2
(45) Date of Patent: Jul. 8, 2025

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hongchao Li, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 261 days.

(21) Appl. No.: 17/797,604

(22) PCT Filed: Dec. 11, 2020

(86) PCT No.: PCT/JP2020/046347
§ 371 (c)(1),
(2) Date: Aug. 4, 2022

(87) PCT Pub. No.: WO2021/157197
PCT Pub. Date: Aug. 12, 2021

(65) Prior Publication Data
US 2023/0056775 A1    Feb. 23, 2023

(30) Foreign Application Priority Data
Feb. 5, 2020    (JP) .................................. 2020-017987

(51) Int. Cl.
*H04W 72/21*    (2023.01)

(52) U.S. Cl.
CPC .................................. *H04W 72/21* (2023.01)

(58) Field of Classification Search
CPC .... H04W 72/21; H04W 72/23; H04L 1/1861; H04L 1/1864; H04L 5/0007;
(Continued)

(56) References Cited

U.S. PATENT DOCUMENTS

2010/0040009 A1    2/2010  Gaal et al.
2012/0327916 A1*  12/2012  Ahn ...................... H04W 72/21
                                                                        370/336
(Continued)

FOREIGN PATENT DOCUMENTS

EP    3 965 492 A1    3/2022
KR    20080029734 A    4/2008
(Continued)

OTHER PUBLICATIONS

3GPP TR 38.913 V15.0.0, "3rd Generation Partnership Project; Technical Specification Group Radio Access Network; Study on Scenarios and Requirements for Next Generation Access Technologies; (Release 15)," Jun. 2018. (39 pages).
(Continued)

*Primary Examiner* — Kan Yuen
(74) *Attorney, Agent, or Firm* — Seed IP Law Group LLP

(57) ABSTRACT

Provided is a terminal comprising: a control circuit which, on the basis of the size of information indicating resource allocation relating to uplink control information, controls allocation of an uplink resource with respect to the uplink control information; and a transmit circuit for transmitting the uplink control information in the uplink resource.

16 Claims, 22 Drawing Sheets

(58) Field of Classification Search
CPC ... H04L 5/0055; H04L 5/0058; H04L 5/0094; H04L 5/0053

See application file for complete search history.

(56) References Cited

U.S. PATENT DOCUMENTS

| | | | | |
|---|---|---|---|---|
| 2013/0259011 | A1* | 10/2013 | Nakashima | H04W 52/48 370/336 |
| 2014/0169319 | A1* | 6/2014 | Yang | H04W 72/21 370/329 |
| 2017/0055249 | A1* | 2/2017 | Yasukawa | H04W 72/23 |
| 2019/0222361 | A1 | 7/2019 | Cheng et al. | |
| 2020/0221445 | A1* | 7/2020 | Tsai | H04L 1/0026 |
| 2020/0266964 | A1* | 8/2020 | Kang | H04W 72/23 |
| 2020/0275430 | A1* | 8/2020 | Salem | H04L 1/1614 |
| 2020/0374045 | A1* | 11/2020 | Yin | H04B 7/0456 |
| 2021/0298028 | A1 | 9/2021 | Matsumura et al. | |
| 2022/0217678 | A1 | 7/2022 | Yoshioka et al. | |

FOREIGN PATENT DOCUMENTS

| | | |
|---|---|---|
| KR | 20110132725 A | 12/2011 |
| WO | 2020/021720 A1 | 1/2020 |
| WO | 2020/225841 A1 | 11/2020 |

OTHER PUBLICATIONS

3GPP TS 23.501 V16.1.0, "3rd Generation Partnership Project; Technical Specification Group Services and System Aspects; System Architecture for the 5G System; Stage 2 (Release 16)," Jun. 2019, 368 pages.
3GPP TS 38.211 V15.6.0, "3rd Generation Partnership Project; Technical Specification Group Radio Access Network; NR; Physical channels and modulation (Release 15)," Jun. 2019, 97 pages.
3GPP TS 38.211 V15.8.0, "3rd Generation Partnership Project; Technical Specification Group Radio Access Network; NR; Physical channels and modulation (Release 15)," Dec. 2019, 97 pages.
3GPP TS 38.212 V15.8.0, "3rd Generation Partnership Project; Technical Specification Group Radio Access Network; NR; Multiplexing and channel coding (Release 15)," Dec. 2019, 101 pages.
3GPP TS 38.212 V16.0.0, "3rd Generation Partnership Project; Technical Specification Group Radio Access Network; NR; Multiplexing and channel coding (Release 16)," Dec. 2019, 145 pages.
3GPP TS 38.213 V15.8.0, "3rd Generation Partnership Project; Technical Specification Group Radio Access Network; NR; Physical layer procedures for control (Release 15)," Dec. 2019, 109 pages.
3GPP TS 38.214 V15.8.0, "3rd Generation Partnership Project; Technical Specification Group Radio Access Network; NR; Physical layer procedures for data (Release 15)," Dec. 2019, 106 pages.
3GPP TS 38.300 V15.6.0, "3rd Generation Partnership Project; Technical Specification Group Radio Access Network; NR; NR and NG-RAN Overall Description; Stage 2 (Release 15)," Jun. 2019, 99 pages.
CATT, "PDCCH enhancements for URLLC," R1-1912168, Agenda Item: 7.2.6.1, 3GPP TSG RAN WG1 Meeting #99, Reno, USA, Nov. 18-22, 2019, 11 pages.
Huawei, HiSilicon, "Revised WID: Physical Layer Enhancements for NR Ultra-Reliable and Low Latency Communication (URLLC)," RP-191584, Agenda Item: 9.1.1, 3GPP TSG RAN Meeting #84, Newport Beach, CA, Jun. 3-6, 2019, 5 pages.
International Search Report, mailed Feb. 16, 2021, for International Application No. PCT/JP2020/046347, 5 pages. (with English translation).
Nokia, Nokia Shanghai Bell, "Revised WID: Support of NR Industrial Internet of Things (IoT)," RP-191561, Agenda Item: 9.4.14, 3GPP TSG RAN Meeting #84, Newport Beach, USA, Jun. 3-6, 2019, 6 pages.
NTT Docomo, Inc., "PDCCH enhancements for URLLC," R1-1813324, Agenda Item: 7.2.6.1.1, 3GPP TSG RAN WG1 Meeting #95, Spokane, US, Nov. 12-16, 2018, 9 pages.
Extended European Search Report, dated Apr. 12, 2023, for European Application No. 1 20918107.2-1215. (9 pages).
Panasonic, "Remaining issue on UCI enhancement," R1-2003814, Agenda Item: 7.2.5.2, 2 3GPP TSG RAN WG1 #101-e, e-Meeting, May 25-Jun. 5, 2020. (5 pages).
Office Action, dated Mar. 5, 2025, for Indian Application No. 202227043630. (5 pages).

\* cited by examiner

TERMINAL AND COMMUNICATION METHOD

TECHNICAL FIELD

The present disclosure relates to a terminal and a communication method.

BACKGROUND ART

In recent years, a dramatic development of Internet of Things (IoT) has been expected with the expansion and diversification of radio services as a background. The usage of mobile communication is expanding to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. Given such a background, the 5th generation mobile communication systems (5G), which have been undergoing research and development and standardization, can flexibly provide radio communication in response to a wide variety of needs by enhanced mobile broadband (eMBB), massive machine type communication (mMTC), and ultra reliable and low latency communication (URLLC).

The 3rd Generation Partnership Project (3GPP) as an international standardizing body has discussed New Radio (NR) as one of 5G radio interfaces and has concluded Release 15 specifications for realizing eMBB and basic URLLC.

For example, the URLLC requirement in Release 15 is to achieve a latency of 1 ms or less for a radio interval with a reliability of 99.999% at the time of transmitting a packet of 32 bytes. In Release 16, on the other hand, in order to extend URLLC to a variety of use cases represented by remote operations or industrial IoTs, an extension of the function to achieve higher requirements in comparison with Release 15, such as an increase in packet size, a further reduction in latency, and an improvement of reliability, has been discussed (see, for example, NPLs 1 and 2).

CITATION LIST

Non-Patent Literatures

NPL 1
RP-191584, "Revised WID: Physical layer enhancements for NR ultra-reliable and low latency communication (URLLC)," Huawei, HiSilicon, June 2019.
NPL 2
RP-191561, "Revised WID: Support of NR industrial Internet of Things (IoT)," Nokia, Nokia Shanghai Bell, June 2019.
NPL 3
3GPP TS 38.211 V15.8.0, "NR; Physical channels and modulation (Release 15)," 2019-12.
NPL 4
3GPP TS 38.212 V15.8.0. "NR; Multiplexing and channel coding (Release 15)," 2019-12.
NPL 5
3GPP TS 38.213 V15.8.0, "NR; Physical layer procedure for control (Release 15)," 2019-12.
NPL 6
3GPP TS 38.214 V15.8.0, "NR; Physical layer procedures for data (Release 15)," 2019-12.
NPL 7
3GPP TS 38.212 V16.0.0, "NR: Multiplexing and channel coding (Release 16)," 2019-12.

SUMMARY OF INVENTION

However, there is scope for further study on a method for assigning control information in uplink.

One non-limiting and exemplary embodiment of the present disclosure facilitates providing a terminal and a communication method each capable of improving the assignment efficiency for control information in radio communication A terminal according to an exemplary embodiment of the present disclosure includes: control circuitry, which, in operation, controls an allocation of an uplink resource with respect to uplink control information based on a size of information indicating a resource allocation relating to the uplink control information; and transmission circuitry, which, in operation, transmits the uplink control information in the uplink resource.

It should be noted that general or specific embodiments may be implemented as a system, a method, an integrated circuit, a computer program, a storage medium, or any selective combination thereof.

According to an exemplary embodiment of the present disclosure, it is possible to improve the assignment efficiency in radio communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
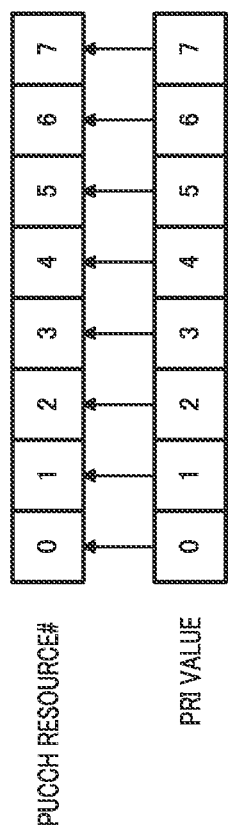
FIG. 1 illustrates an example of Physical Uplink Control Channel (PUCCH) resource allocation.

Hereinafter, embodiments of the present disclosure will be described in detail with reference to the accompanying drawings.

For example, in downlink of NR, a terminal (e.g., may be referred to as User Equipment (UE)) receives downlink data (e.g., Physical Downlink Shared Channel (PDSCH)) according to resource allocation indicated by a base station (e.g., may be referred to as gNB) (e.g., see NPLs 3 to 6). Information on the resource allocation may be indicated from the base station to the terminal by, for example, a layer-1 control signal (e.g., Downlink Control Information (DCI)) in a downlink control channel (e.g., Physical Downlink Control Channel (PDCCH)).

Further, the terminal feedbacks, to the base station, a response signal (e.g., Acknowledgement/Negative Acknowledgement (ACK/NACK) or Hybrid Automatic Repeat Request (HARQ)-ACK) indicating success or failure of decoding for PDSCH by using, for example, an uplink control channel (e.g., Physical Uplink Control Channel (PUCCH)) (e.g., see NPL 5).

Further, the terminal may use, for example, PUCCH to transmit, in addition to ACK/NACK, downlink channel state information (e.g., Channel State Information (CSI)) and uplink radio resource allocation request (e.g., Scheduling Request (SR)) to the base station. ACK/NACK, CSI, and SR may be also referred to as uplink control information (e.g., Uplink Control Information (UCI)).

In NR Rel. 15, the following method is adopted with respect to identification of a PUCCH resource for transmitting ACK/NACK to PDSCH assigned by DCI (see, e.g., NPL 5). For example, a base station indicates (in other words, configures or instructs) a union of semi-static PUCCH resources (e.g., may be referred to as PUCCH resource set or resource list) by using an UE-specific higher layer signalling (e.g., may be referred to as radio resource control (RRC) signal, higher layer signaling, or higher layer parameter). The base station then indicates (e.g., indicate) the PUCCH resource to be allocated to the terminal among a plurality of PUCCH resources included in the PUCCH resource set by DCI (i.e., dynamic signaling).

Here, the PUCCH resource may be configured with, for example, parameters such as a PUCCH format, a time resource (e.g., symbol position or number of symbols), a frequency resource (e.g., physical resource block (PRB) number, number of PRBs, and/or whether to apply frequency hopping), or a code resource (e.g., cyclic shift sequence number or orthogonal code number).

In NR Rel. 15, among a plurality of PUCCH resources included in a PUCCH resource set, a PUCCH resource allocated to a terminal is controlled based on, for example, a PUCCH Resource Indicator (PRI) field composed of three bits of DCI. By way of example, a PUCCH resource set including a plurality of PUCCH resources is previously configured for the terminal by the higher layer signalling, and, from among the configured PUCCH resource set, one PUCCH resource is instructed by the PRI field of DCI; thereby the PUCCH resource is allocated to the terminal (for example, see NPL 3).

FIG. 1 illustrates an example of PUCCH resource allocation (mapping (association) between value of PRI (hereinafter may be also referred to as PRI value) and PUCCH resource) in a case where the number of PUCCH resources included in a PUCCH resource set is eight.

In the example illustrated in FIG. 1, for example, PUCCH resources 0 to 7 are mapped to PRI values (also referred to as PRI field values) 0 to 7, respectively.

Meanwhile, when the number of PUCCH resources included in a PUCCH resource set is greater than eight, the PUCCH resource may be allocated based on, for example, in addition to the PRI field of DCI, information on Control Channel Element (CCE), which is a radio resource unit of PDCCH for transmitting DCI. For example, a PUCCH resource (e.g., PUCCH resource number $r_{PUCCH}$) may be given by following Equation 1 (e.g., see NPL 5).

[1]

$$r_{PUCCH} = \begin{cases} \left\lfloor \frac{n_{CCE,p} \cdot \left\lceil \frac{R_{PUCCH}}{8} \right\rceil}{N_{CCE,p}} \right\rfloor + \\ \qquad \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \left\lceil \frac{R_{PUCCH}}{8} \right\rceil}{N_{CCE,p}} \right\rfloor + \\ \qquad \Delta_{PRI} \cdot \left\lfloor \frac{R_{PUCCH}}{8} \right\rfloor + R_{PUCCH} & \bmod 8 \text{ if } \Delta_{PRI} \geq R_{PUCCH} \bmod 8 \end{cases}$$

(Equation 1)

Here, $R_{PUCCH}$ indicates the number of PUCCH resources included in the PUCCH resource set, $N_{CCE,p}$ indicates the number of CCEs included in control resource set (p) (CORESET(p)) for transmitting PDCCH, $n_{CCE,p}$ indicates the first CCE number assigned to PDCCH for transmitting DCI, and $\Delta_{PRI}$ indicates the PRI value.

Further, in the following, a ceiling function for value x, as illustrated in Equation 1, is sometimes referred to as "ceiling (x)," whereas a floor function for value x may be referred to as "floor (x)."

Figure 2:
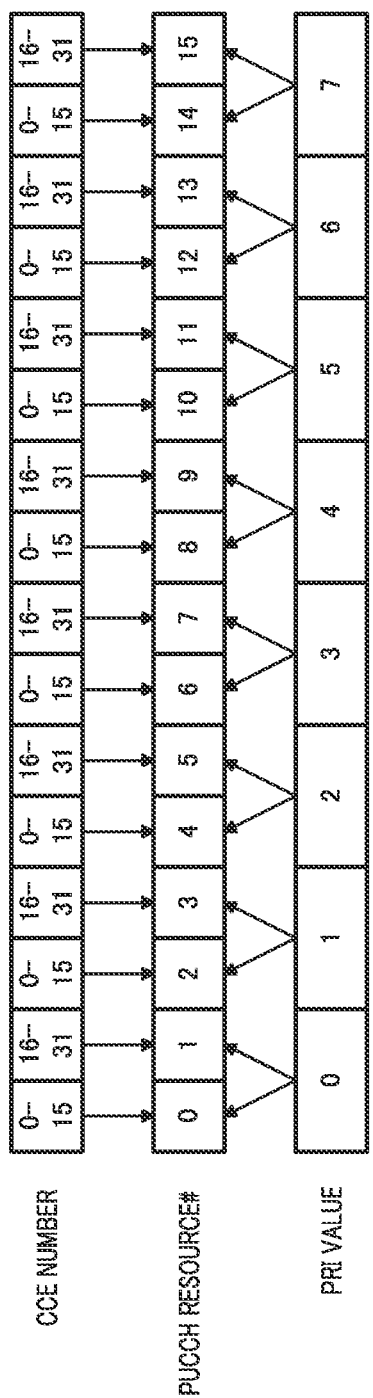
FIG. 2 illustrates another example of the PUCCH resource allocation.

FIG. 2 illustrates an example of PUCCH resource allocation (mapping between PRI values and CCE numbers on one hand and PUCCH resources on the other hand) in a case where the number of PUCCH resources included in a PUCCH resource set is greater than eight. In the example illustrated in FIG. 2, for example, $R_{PUCCH}$, which is the number of PUCCH resources included in the PUCCH resource set, is 16 (PUCCH resources 0 to 15), $N_{CCE,p}$, which is the number of CCEs, is 32, $n_{CCE,p}$, which is the CCE number, is any of 0 to 31, and $\Delta_{PRI}$, which is the PRI value, is any of 0 to 7.

As illustrated in FIG. 2, two PUCCH resources are mapped to each of the PRI values (e.g., any of 0 to 7). Further, a CCE group of a different CCE number (either CCE 0-15 or CCE 16-31) is mapped to each of the two PUCCH resources mapped to one PRI value. The terminal may identify (in other words, determine or configure) the PUCCH resource allocated to the terminal based on, for example, a combination of a PRI value indicated by DCI and a CCE (e.g., first CCE) number used for transmitting the DCI (in other words, PDCCH).

Here, in order to achieve high reliability in URLLC, for example, the same or higher reliability as for PDSCH is required for PDCCH. In one example, configuring, for a terminal in URLLC (hereinafter referred to as URLLC terminal), allocating a greater number of PDCCH resources (e.g., CCEs) achieves a low coding rate, and thus, the reliability of PDCCH can be improved. However, since the number of PDCCH resources allocated to one terminal increases, the number of PDCCH resources that can be allocated may be insufficient depending on the number of terminals, which may result in, for example, an increase in blocking frequency.

For example, a PDCCH resource of the subsequent transmission occasion may be allocated to a blocked terminal. However, as the blocking frequency increases, the radio interval latency may also increase. Further, for example, reducing the number of CCEs to be shared between terminals can reduce the blocking frequency, but scheduling flexibility may decrease.

In NR Rel. 16, in order to achieve the high reliability of PDCCH while suppressing the number of CCE allocations for each terminal and ensuring the scheduling flexibility, for example, new DCI for URLLC (e.g., DCI Format 1-2) is defined (e.g., see NPL 7). In DCI for URLLC, the number of DCI bits of PDCCH can be reduced. For example, in DCI Format 1-2, the number of PRI bits (i.e., PRI field size) can be set to any of zero, one, two, and three bits.

Thus, up to Rel. 15, the number of PRI bits is set to a fixed value (e.g., three bits), and the mapping between a PUCCH resource and a PRI value of the fixed number of bits (or PRI value and CCE number) is defined. In contrast, in URLLC of Rel. 16, the number of PRI bits is configured to be variable (e.g., any of zero to three bits). However, an allocation method for PUCCH resources (hereinafter may be also referred to as "PUCCH resource allocation method") when the number of PRI bits is variable has not been thoroughly studied.

An exemplary embodiment of the present disclosure will describe, for example, a method for improving the efficiency of PUCCH resource allocation based on the number of PRI bits configured to be variable. For example, a terminal controls the PUCCH resource allocation based on the number of PRI bits indicated by DCI. The PUCCH resource allocation method in URLLC can be improved in efficiency by being based on the number of PRI bits (not PRI value). Note that, the term "number of bits" may be replaced with the term "bit size" or "bit length." Similarly, in the following description, the term "number of XXs" may be replaced with the term "XX size" or "XX length."

[Overview of Communication System]

A communication system according to each embodiment of the present disclosure includes base station 100 and terminal 200.

Figure 3:
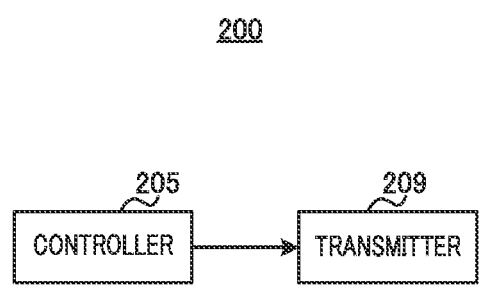
FIG. 3 is a block diagram illustrating a configuration example of a part of a terminal.

FIG. 3 is a block diagram illustrating a configuration example of a part of terminal 200 according to an exemplary embodiment of the present disclosure. In terminal 200 illustrated in FIG. 3, controller 205 (e.g., corresponding to control circuitry) controls allocation of an uplink resource for uplink control information (e.g., PUCCH resource) based on the size of information (e.g., PRI) indicating resource allocation relating to the uplink control information (e.g., UCI such as ACK/NACK). Transmitter 209 (e.g., corresponding to transmission circuitry) transmits the uplink control information in the uplink resource.

Embodiment 1

[Configuration of Base Station]

Figure 4:
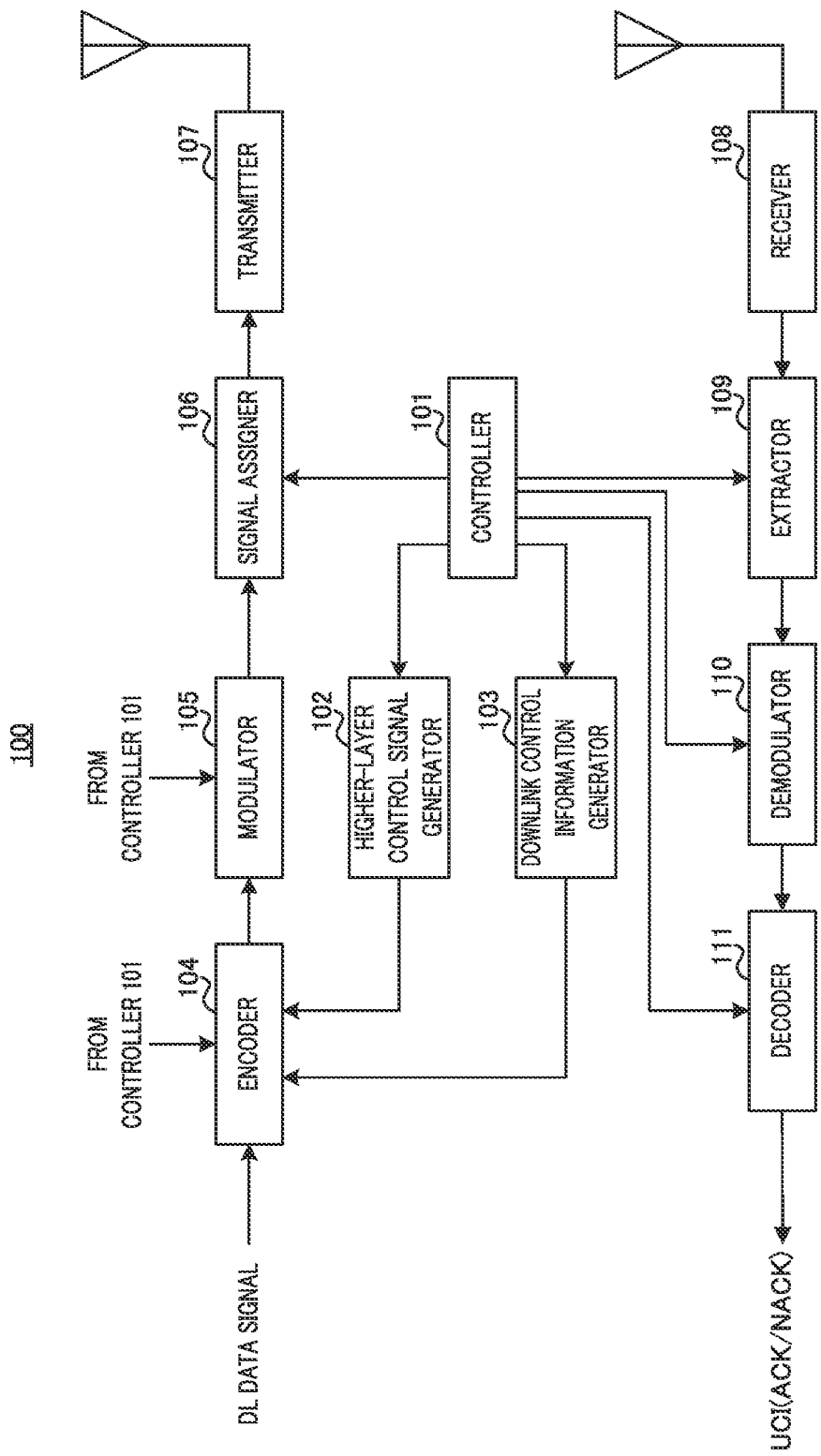
FIG. 4 is a block diagram illustrating a configuration example of a base station.

FIG. 4 is a block diagram illustrating a configuration example of base station 100 according to Embodiment 1. In FIG. 4, base station 100 includes controller 101, higher-layer control signal generator 102, downlink control information generator 103, encoder 104, modulator 105, signal assigner 106, transmitter 107, receiver 108, encoder 109, demodulator 110, and decoder 111.

Controller 101, for example, determines information on a PUCCH resource for terminal 200 and outputs the determined information to higher-layer control signal generator 102. The PUCCH resource information may include information on the number of PUCCH resources included in a PUCCH resource set. Further, the PUCCH resource information may include, for example, information on a mapping between a PUCCH resource and a value of PRI or information such as an offset value.

Controller 101 also determines, for example, information on DCI reception in terminal 200 and outputs the determined information to higher-layer control signal generator 102. The DCI reception information may include information such as the number of DCI bits (e.g., number of PRI bits), a setting of CORESET, or a setting of the search space.

Controller 101 also determines information on a downlink signal for transmitting a downlink data signal (e.g., PDSCH), a higher-layer control signal, or downlink control information (e.g., DCI). The information on the downlink signal may include information such as a Modulation and Coding Scheme (MCS) and radio resource allocation. Controller 101, for example, outputs the determined information to encoder 104, modulator 105, and signal assigner 106. In addition, controller 101 outputs information on the downlink signal, such as the data signal or the higher-layer control signal, to downlink control information generator 103.

Controller 101 also determines information on a PUCCH resource for the terminal to transmit the uplink control signal (e.g., PUCCH), and outputs the determined information to downlink control information generator 103 and extractor 109. The PUCCH resource information may include, for example, information on a PRI value.

Higher-layer control signal generator 102 generates a higher-layer control signal bit string based on information input from controller 101 (including, for example, information on PUCCH resource or information on DCI reception) and outputs the higher-layer control signal bit string to encoder 104.

Downlink control information generator 103 generates a downlink control information (e.g., DCI) bit string based on information (e.g., information on PUCCH resource) input from controller 101 and outputs the generated DCI bit string to encoder 104. Note that, the control information may be transmitted to a plurality of terminals. Downlink control information generator 103, for example, may include the PUCCH resource information input from controller 101 in a PRI field of the DCI bit string.

Incidentally, the control information may be transmitted to a plurality of terminals. Hence, downlink control information generator 103 may scramble, by UE-specific identification information, PDCCH that transmits DCI. The UE-specific identification information may be any of the following information: Temporary Cell Radio Network Temporary Identifier (TC-RNTI); Cell RNTI (C-RNTI); and Modulation and Coding Scheme C-RNTI (MCS-C-RNTI), or may be other information (e.g., other RNTI). The other RNTI may be, for example, RNTI to be introduced for URLLC.

Encoder 104, for example, encodes downlink data, a bit string input from higher-layer control signal generator 102, or a DCI bit string input from downlink control information generator 103, based on information input from controller 101. Encoder 104 outputs the encoded bit string to modulator 105.

Modulator 105, for example, modulates an encoded bit string input from encoder 104, based on information input from controller 101, and outputs the modulated signal (e.g., symbol string) to signal assigner 106.

Signal assigner 106 maps, to a radio resource, a symbol string (including, for example, downlink data or control signal) input from modulator 105, based on radio resource-indicating information input from controller 101. Signal assigner 106 outputs, to transmitter 107, a downlink signal to which the signal is mapped.

Transmitter 107 performs transmission-waveform generation processing such as orthogonal Frequency Division Multiplexing (OFDM) on a signal input from signal assigner 106. In addition, in the case of an OFDM transmission in which a cyclic prefix (CP) is added, transmitter 107 performs Inverse Fast Fourier Transform (IFFT) processing on a signal, and adds the CP to the signal resulting from the IFFT. Moreover, transmitter 107 performs RF processing such as D/A conversion or up-conversion on a signal, and transmits the resulting radio signal to terminal 200 via an antenna.

Receiver 108 performs RF processing such as down-conversion or A/D conversion on an uplink signal received from terminal 200 via the antenna. Further, in the case of the OFDM transmission, receiver 108 performs Fast Fourier Transform (FFT) processing on a received signal, and outputs the resulting frequency-domain signal to extractor 109.

Extractor 109 extracts a radio resource part with which an uplink signal to be transmitted by terminal 200 is transmitted based on information input from controller 101, and outputs the extracted radio resource part to demodulator 110.

Demodulator 110 demodulates a signal (e.g., PUCCH) input from extractor 109 based on information input from controller 101. Demodulator 110, for example, outputs a demodulation result to decoder 111.

Decoder 111 performs error correction decoding on an uplink signal based on information input from controller 101 and a demodulation result input from demodulator 110 to obtain a reception bit sequence (e.g., UCI such as ACK/NACK) after decoding.

[Configuration of Terminal]

Figure 5:
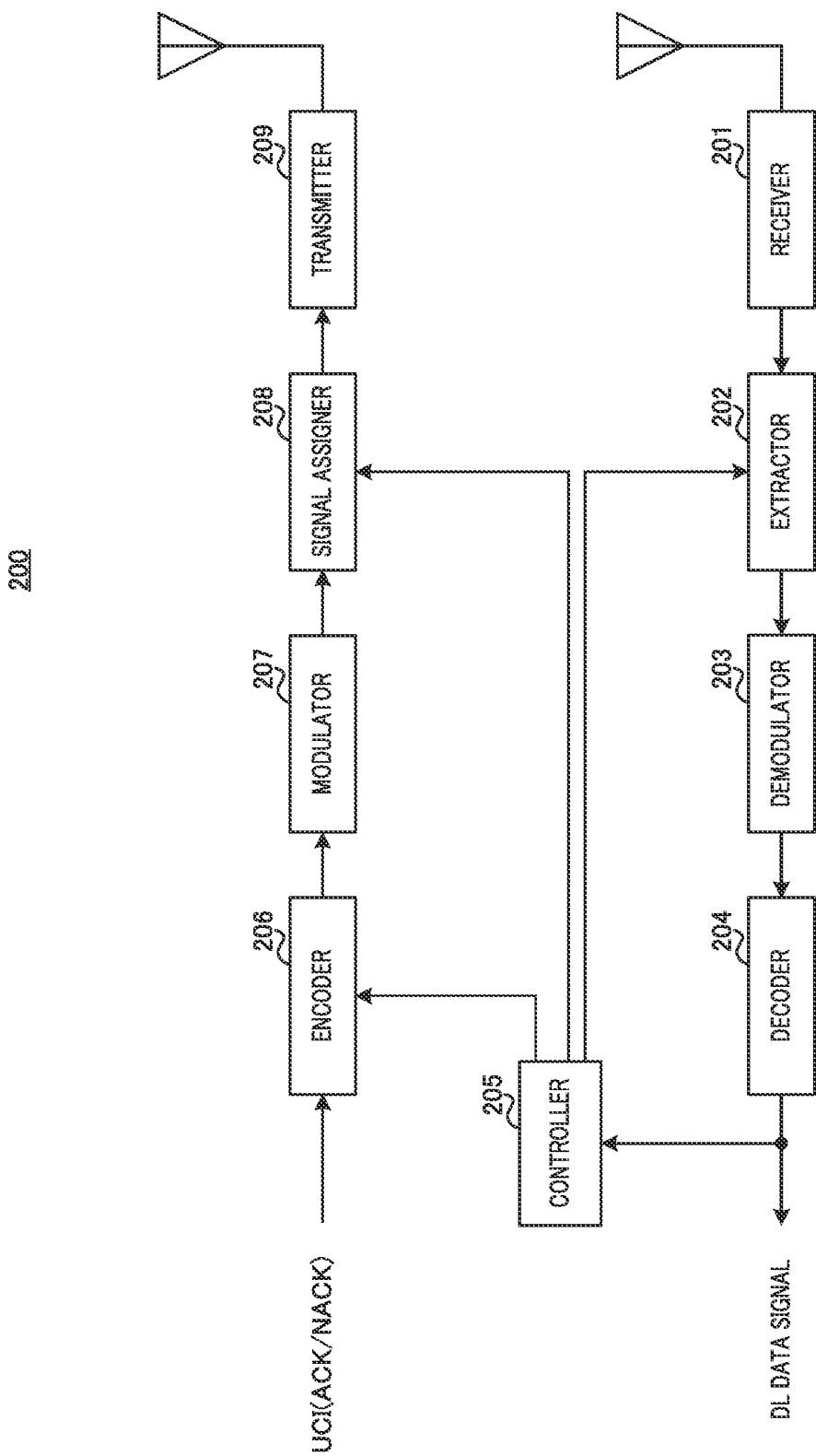
FIG. 5 is a block diagram illustrating a configuration example of the terminal.

FIG. 5 is a block diagram illustrating a configuration example of terminal 200 according to an exemplary embodiment of the present disclosure. For example, in FIG. 5, terminal 200 includes receiver 201, extractor 202, demodulator 203, decoder 204, controller 205, encoder 206, modulator 207, signal assigner 208, and transmitter 209.

Receiver 201 receives a downlink signal (e.g., downlink data signal or downlink control information) from base station 100 via an antenna, performs the RF processing such as the down-conversion or the A/D conversion on the received radio signal to obtain a received signal (baseband signal). Further, in the case of receiving an OFDM signal, receiver 201 performs the FFT processing on the received signal to convert the received signal into that in the frequency domain. Receiver 201 outputs the received signal to extractor 202.

Extractor 202 extracts a radio resource part, which may include downlink control information, from a received signal input from receiver 201 based on information on a radio resource in downlink control information input from controller 205, and outputs the radio resource part to demodulator 203. Further, extractor 202 extracts a radio resource part which includes downlink data based on information on a radio resource for a data signal input from controller 205, and outputs the radio resource part to demodulator 203.

Demodulator 203 demodulates a signal input from extractor 202 and outputs a demodulation result to decoder 204.

Decoder 204 performs error correction decoding on a demodulation result input from demodulator 203 to obtain, for example, downlink reception data, a higher-layer control signal, or downlink control information. Decoder 204 outputs the higher-layer control signal and the downlink control information to controller 205, and outputs the downlink reception data. Further, decoder 204 may generate a response signal (e.g., ACK/NACK) based on a decoding result of the downlink reception data and output the generated response signal to encoder 206.

Controller 205 determines radio resources for a downlink signal (e.g., PDSCH) and an uplink signal (e.g., PUCCH) based on, for example, at least one of the PUCCH resource information, the DCI reception information, the PRI information included in DCI, and information on a radio resource (e.g., CCE) of PDCCH that has received the downlink control information, these kinds of information being included in the higher-layer control signal input from encoder 204. Controller 205, for example, outputs information indicating the determined radio resource for the downlink signal to extractor 202 and outputs information indicating the determined radio resource for the uplink signal to signal assigner 208. Controller 205 may also determine, for example, information on a transmission of the uplink signal and output the determined information to encoder 206.

Encoder 206 encodes an uplink signal (e.g., UCI) based on information input from controller 205 and outputs the encoded bit string to modulator 207. The UCI may include, for example, ACK/NACK input from decoder 204. Note that, encoding may not be performed in some PUCCH formats.

Modulator 207 modulates an encoded bit string input from encoder 206 and outputs the modulated signal (symbol string) to signal assigner 208.

Signal assigner 208 maps a signal input from modulator 207 to a radio resource based on information input from controller 205, and outputs an uplink signal to which the signal is mapped to transmitter 209.

Transmitter 209, for example, performs the transmission-waveform generation processing such as the OFDM on a signal input from signal assigner 208. In addition, in the case of, for example, the OFDM transmission using the CP, transmitter 209 performs the IFFT processing on a signal, and adds the CP to the signal resulting from the IFFT. Alternatively, when transmitter 209 generates a single-carrier waveform, a Discrete Fourier Transformer (DFT) may be additionally provided at a rear stage of modulator 207 or a front stage of signal assigner 208 (neither is illustrated). Moreover, transmitter 209 performs the RF processing such as the D/A conversion or the up-conversion on a transmission signal, and transmits the resulting radio signal to base station 100 via the antenna.

[Operation Example of Base Station 100 and Terminal 200]

An operation example of base station 100 and terminal 200 having the above configurations will be described.

Figure 6:
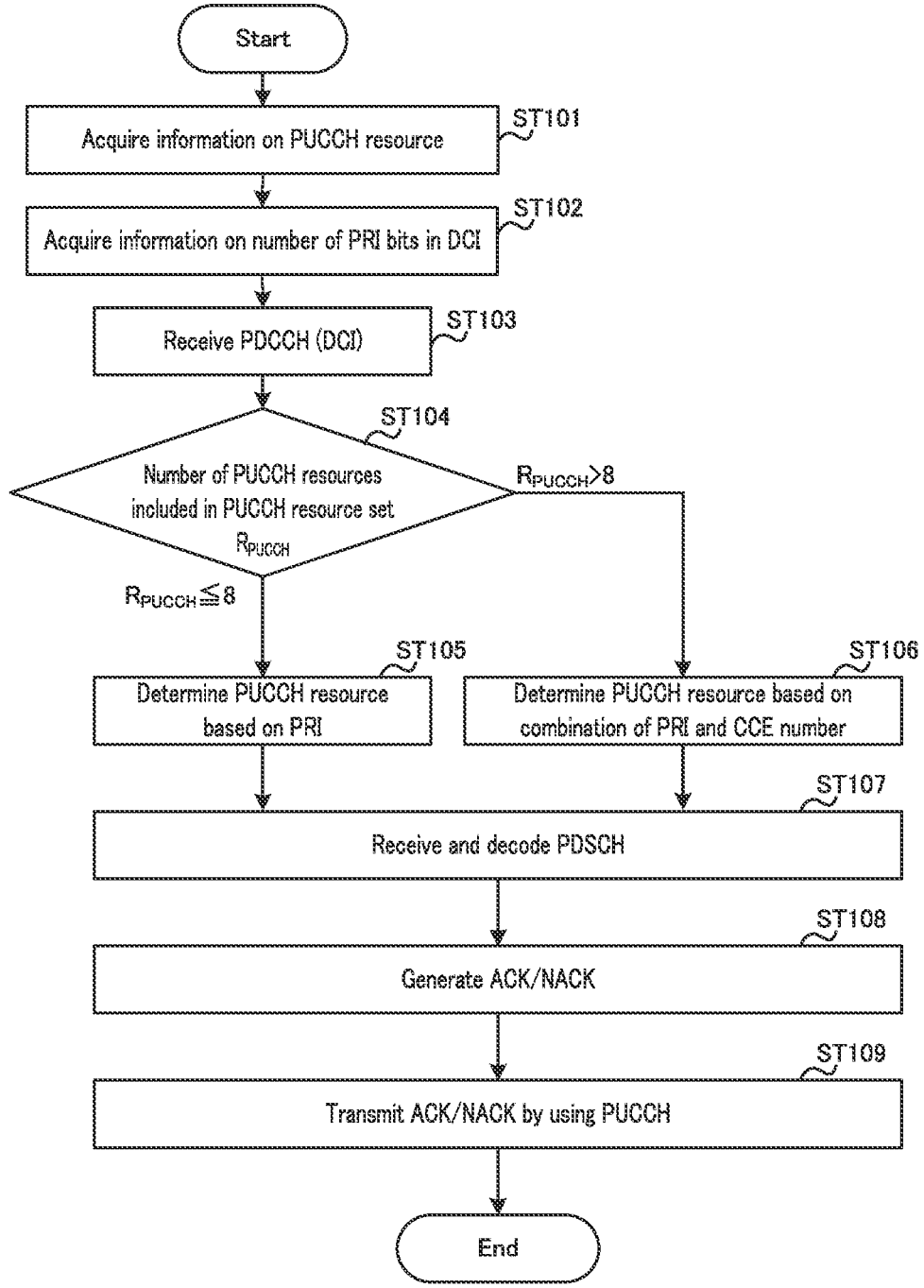
FIG. 6 is a flowchart illustrating an operation example of a terminal according to Embodiment 1.

FIG. 6 is a flowchart illustrating an operation example of terminal 200 according to the present embodiment.

In FIG. 6, terminal 200 acquires, for example, information on a PUCCH resource (e.g., PUCCH resource set)(ST101). The PUCCH resource information may be configured from base station 100 to terminal 200 by, for example, UE-specific higher layer (e.g., RRC) signaling. Further, the PUCCH resource information may include, for example, information on a union of PUCCH resources (e.g., PUCCH resource set) that is configured semi-statically.

Terminal 200 acquires, for example, information on the number of PRI bits included in DCI (number of PRI bits) (ST102). The information on the number of PRI bits may be configured from base station 100 to terminal 200 by, for example, higher layer (e.g., RRC) signaling. This indication (or configuration) of information on the number of PRI bits allows terminal 200 to receive DCI in which the number of PRI bits (e.g., N bits) is configured to be variable.

Terminal 200 receives, for example, PDCCH including DCI (ST103). DCI may include, for example, information on an allocation resource of a downlink data signal (PDSCH) or information on an allocation resource of an uplink signal. Further, the information on the allocation resource of the uplink signal may include, for example, information on a PUCCH resource allocated to terminal 200 (e.g., PRI) among the plurality of PUCCH resources included in the PUCCH resource set configured for terminal 200.

For example, terminal 200 compares, for example, the number of PUCCH resources included in the PUCCH resource set (e.g., $R_{PUCCH}$) with a defined value (here, eight) (ST104).

In a case where the number of PUCCH resources included in the PUCCH resource set ($R_{PUCCH}$) is equal to or less than eight, terminal 200 determines the PUCCH resource based on a PRI value (e.g., $\Delta_{PRI}$) (ST105). For example, terminal 200 may determine, as the PUCCH resource allocated to terminal 200, a PUCCH resource mapped to the PRI value in a one-to-one manner, among the PUCCH resources included in the PUCCH resource set.

On the other hand, in a case where the number of PUCCH resources included in the PUCCH resource set ($R_{PUCCH}$) is greater than eight, terminal 200 determines the PUCCH resource based on a combination of a PRI value and a CCE number used for the received PDCCH (e.g., first CCE number) (ST106). For example, terminal 200 may determine, as the PUCCH resource allocated to terminal 200, a PUCCH resource mapped to the combination of a PRI value and a CCE number, among the PUCCH resources included in the PUCCH resource set.

Terminal 200 receives, for example, a downlink data signal (e.g., PDSCH) and decodes the received PDSCH (ST107). Further, terminal 200 generates ACK/NACK for PDSCH based on, for example, a decoding result of PDSCH (ST108).

Terminal 200, for example, transmits ACK/NACK to base station 100 by using the determined PUCCH resource (ST109).

Incidentally, in FIG. 6, the order of the processing for acquiring the information on the PUCCH resource (ST101) and the processing for acquiring the information on the number of PRI bits included in DCI (ST102) is not limited (e.g., may be executed in reverse order or in parallel) (the same applies to following description). Further, in FIG. 6, the order of the processing related to the PUCCH resource determination (e.g., ST104, ST105, and ST106) and the processing related to the reception and decoding of PDSCH and the ACK/NACK generation (e.g., ST107 and ST108) is not limited (e.g., may be executed in reverse order or in parallel) (the same applies to following description).

[Allocation Example for PUCCH Resource]

Next, an exemplary allocation method (i.e., determination method) for a PUCCH resource according to the present embodiment will be described.

In the present embodiment, terminal 200 supports reception of a DCI in which the number of PRI bits (e.g., N bits) is configured to be variable (e.g., configurable with any of zero, one, two, and three bits).

Terminal 200 controls PUCCH resource allocation to PUCCH (e.g., ACK/NACK) among a plurality of PUCCH resources included in a PUCCH resource set, based on, for example, PRI of N bits included in the received DCI. Terminal 200 then transmits PUCCH according to the control for the PUCCH resource allocation.

[Case Where Number of PUCCH Resources Included in PUCCH Resource Set is Eight or Less]

In a case where the number of PUCCH resources included in the PUCCH resource set is equal to or less than eight, terminal 200 may identify (i.e., determine or configure: the same applies hereinafter) a PUCCH resource mapped, in a one-to-one manner, to the PRI value included in DCI, from among the PUCCH resources included in the PUCCH resource set (in other words, PUCCH resource candidates), for example.

Figure 7:
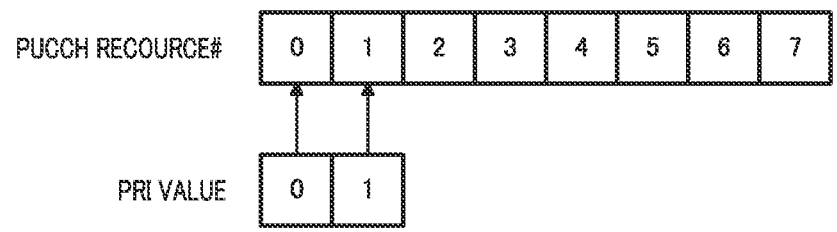
FIG. 7 illustrates an example of PUCCH resource allocation according to Embodiment 1.

FIG. 7 illustrates an example of PUCCH resource allocation (e.g., mapping between PRI value and PUCCH resource) when N=one bit (e.g., PRI=0 or 1). Moreover, in FIG. 7, the number of PUCCH resources included in the PUCCH resource set ($R_{PUCCH}$) is eight (i.e., equal to or less than eight). Furthermore, in FIG. 7, the PRI values (ΔPRI) 0 and 1 are respectively mapped to PUCCH resource 0 and 1 in a one-to-one manner.

In FIG. 7, for example, terminal 200 determines, as the PUCCH resource to be allocated to terminal 200, PUCCH resource 0 in a case where the PRI value included in DCI is 0 whereas determines PUCCH resource 1 in a case where the PRI value included in DCI is 1.

Figure 8:
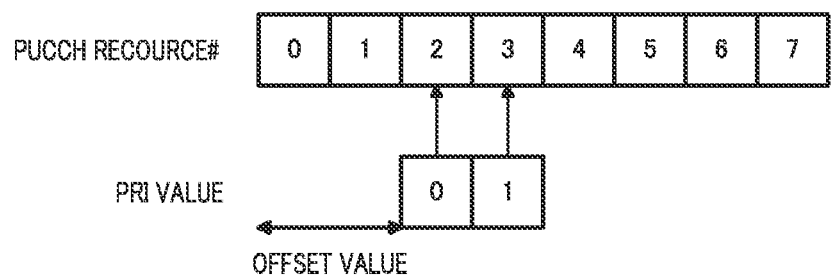
FIG. 8 illustrates another example of the PUCCH resource allocation according to Embodiment 1.

In the mapping between a PRI value and a PUCCH resource, as in the example illustrated in FIG. 7, a PRI value and a PUCCH resource having the same number as the PRI value may be mapped, or a PRI value and a PUCCH resource having a different number from the PRI value may be mapped. In one example, FIG. 8 illustrates an exemplary mapping between PRI values and PUCCH resources each having a PUCCH resource number of a value obtained by adding an offset value to a corresponding one of the PRI values when N=one bit (e.g., $\Delta_{PRI}$=0 or 1). Further, for example, FIG. 9 illustrates an exemplary mapping between PRI values and PUCCH resources each having a PUCCH resource number of a value obtained by multiplying a corresponding one of the PRI values by a defined value (e.g., $8/2^N$ in Equation 4 to be described later) when N=one bit (e.g., PRI=0 or 1).

Figure 9:
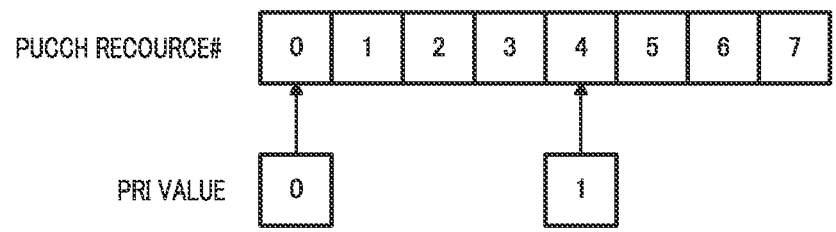
FIG. 9 illustrates still another example of the PUCCH resource allocation according to Embodiment 1.

For example, the PUCCH resource numbers ($r_{PUCCH}$) in the examples of FIGS. 7, 8, and 9 may be given by following Equations 2, 3, and 4, respectively.

[2]
$$r_{PUCCH} = \Delta_{PRI} \quad \text{(Equation 2)}$$

[3]
$$r_{PUCCH} = \Delta_{PRI} + N_{offset} \quad \text{(Equation 3)}$$

[4]
$$r_{PUCCH} = \Delta_{PRI} \frac{8}{2^N} \quad \text{(Equation 4)}$$

Where $r_{PUCCH}$ indicates the PUCCH resource number included in the PUCCH resource set, and $\Delta_{PRI}$ indicates the PRI value. Further, $N_{offset}$ indicates the offset value illustrated in FIG. 8. Incidentally, although FIG. 8 illustrates a case where $N_{offset}=2$, the value of $N_{offset}$ is not limited to two and may be another value.

Incidentally, in FIGS. 7 to 9, a case where the number of PRI bits N=1 has been described as an example, but the number of PRI bits N may be another value different from one. For example, when N=2, four ($=2^N$) PUCCH resources may be mapped to four PRI values (e.g., 0 to 3) in a one-to-one manner.

Thus, terminal 200 can identify the PUCCH resource based on the number of PRI bits when the number of PRI bits included in DCI is variable.

Further, the mapping between a PRI value and a PUCCH resource is not limited to the above-mentioned examples, and for example, it is applicable as long as PUCCH resources of $2^N$ included in the PUCCH resource set and the PRI values (values taking $2^N$ ways) may be mapped to each other in a one-to-one manner. In addition, the mapping between a PUCCH resource and a PRI value may be defined by standards or may be indicated to terminal 200 by the higher layer signalling. Moreover, for example, in a case of the example illustrated in FIG. 8 (Equation 3), the offset value ($N_{offset}$) may be defined by standards or may be indicated to terminal 200 by the higher layer signalling.

[Case Where Number of PUCCH Resources Included in PUCCH Resource Set is Greater Than Eight]

In a case where the number of PUCCH resources included in the PUCCH resource set ($R_{PUCCH}$) is greater than eight, terminal 200 may identify the PUCCH resource from among the PUCCH resources included in the PUCCH resource set, based on, for example, information on PRI included in DCI and on CCE of PDCCH including DCI.

For example, the PUCCH resource number ($r_{PUCCH}$) may be given by following Equation 5.

[5]
$$r_{PUCCH} = \begin{cases} \left\lfloor \frac{n_{CCE,p} \cdot \lceil R_{PUCCH}/8 \rceil}{N_{CCE,p}} \right\rfloor + & \text{if } \Delta_{PRI} < R_{PUCCH} \bmod 8 \\ \Delta_{PRI} \cdot \lceil R_{PUCCH}/8 \rceil & \\ \left\lfloor \frac{n_{CCE,p} \cdot \lceil R_{PUCCH}/8 \rceil}{N_{CCE,p}} \right\rfloor + & \\ \Delta_{PRI} \cdot \left\lceil \frac{R_{PUCCH}}{8} \right\rceil + R_{PUCCH} & \bmod 8 \text{ if } \Delta_{PRI} \geq R_{PUCCH} \bmod 8 \end{cases}$$
(Equation 5)

Where, $N_{CCE,p}$ indicates the number of CCEs included in control resource set (p) for transmitting PDCCH, $n_{CCE,p}$ indicates the first CCE number assigned to PDCCH for transmitting DCI, and $\Delta_{PRI}$ indicates the PRI value.

Figure 10:
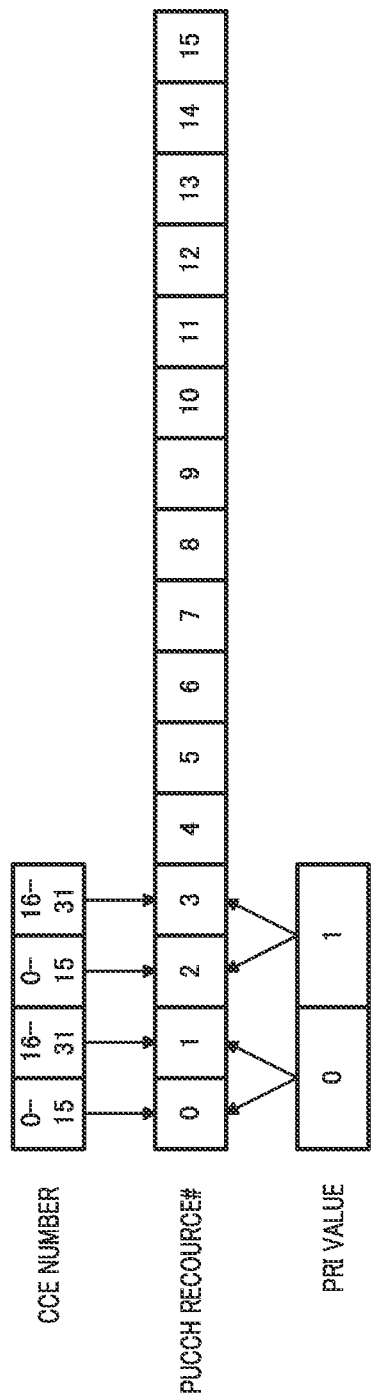
FIG. 10 illustrates still another example of the PUCCH resource allocation according to Embodiment 1.

FIG. 10 illustrates an example of PUCCH resource allocation (mapping between PRI values and CCE numbers on one hand and PUCCH resources on the other hand) when N=one bit (e.g., $\Delta_{PRI}=0$ or 1). Moreover, in FIG. 10, the number of PUCCH resources included in the PUCCH resource set ($R_{PUCCH}$) is 16 (i.e., greater than eight). Furthermore, in FIG. 10, $N_{CCE,p}$, which is the number of CCEs, is 32.

As illustrated in FIG. 10, PUCCH resources 0 and 1 are mapped to PRI=0, and PUCCH resources 2 and 3 are mapped to PRI=1. That is, two PUCCH resources are mapped to one PRI value.

Further, as illustrated in FIG. 10, among the PUCCH resources mapped to PRI=0, PUCCH resource 0 is mapped to a CCE group having CCE numbers 0 to 15, and PUCCH resource 1 is mapped to a CCE group having CCE numbers 16 to 31. Similarly, in FIG. 10, among the PUCCH resources mapped to PRI=1, PUCCH resource 2 is mapped to the CCE group having CCE numbers 0 to 15, and PUCCH resource 3 is mapped to the CCE group having CCE numbers 16 to 31.

In FIG. 10, for example, terminal 200 determines, as the PUCCH resource to be allocated to terminal 200, a PUCCH resource mapped to a combination of a PRI value included in DCI ($\Delta_{PRI}$) and a CCE number (e.g., first CCE number) used for transmission of PDCCH including DCI, among PUCCH resources 0 to 15 included in the PUCCH resource set.

In the mapping between the combination of a PRI value and a CCE number, and a PUCCH resource, as in the example illustrated in FIG. 10, PUCCH resources may be sequentially mapped to the PRI values in this order from the beginning of PUCCH resources (PUCCH resource 0). Alternatively, as illustrated in FIG. 11, a PUCCH resource may be sequentially mapped to the PRI value in this order from the PUCCH resource number of a value obtained by adding an offset value to the PRI value, or, as illustrated in FIG. 12, a PUCCH resource number of a value obtained by multiplying the PRI value by a defined value (e.g., $8/2^N$ in Equation 7 to be described later) may be mapped to the PRI value.

Figure 11:
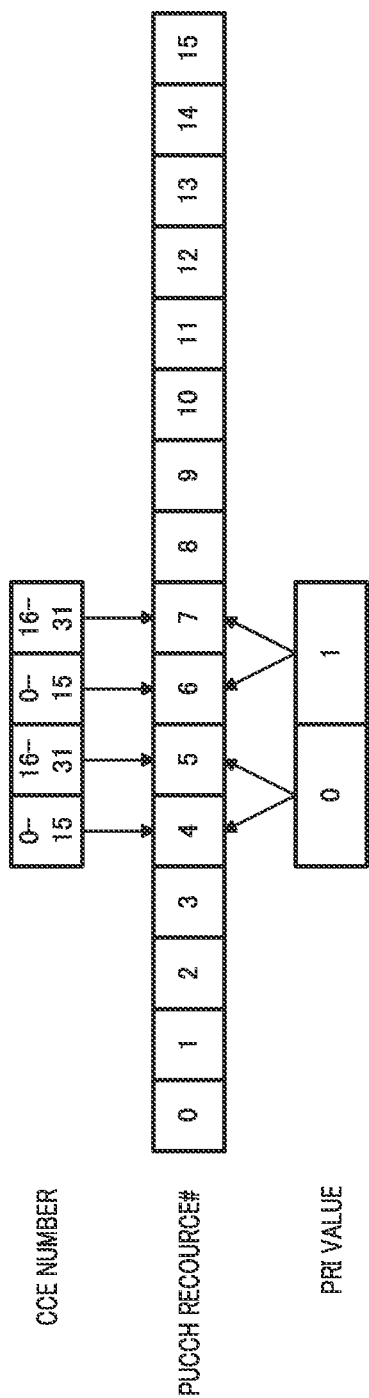
FIG. 11 illustrates still another example of the PUCCH resource allocation according to Embodiment 1.
Figure 12:
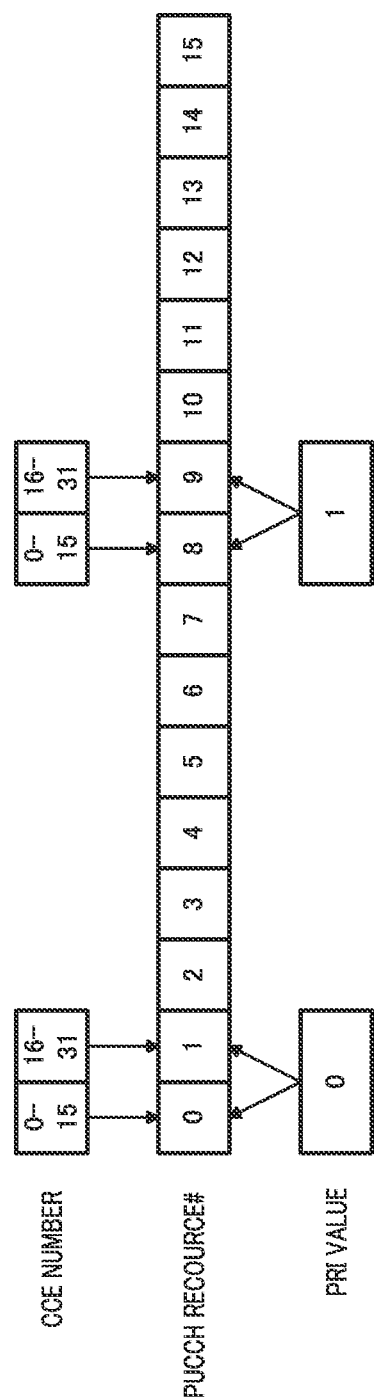
FIG. 12 illustrates yet another example of the PUCCH resource allocation according to Embodiment 1.

For example, the PUCCH resource number ($r_{PUCCH}$) in each of the examples of FIGS. 11 and 12 may be respectively given by following Equations 6 and 7.

[6]

(Equation 6)

$$r_{PUCCH} = \begin{cases} \left\lfloor \dfrac{n_{CCE,p} \cdot \lceil R_{PUCCH}/8 \rceil}{N_{CCE,p}} \right\rfloor + \\ \Delta_{PRI} \cdot \left\lceil \dfrac{R_{PUCCH}}{8} \right\rceil + N_{offset} & \text{if } \Delta_{PRI} < R_{PUCCH} \bmod 8 \\ \left\lfloor \dfrac{n_{CCE,p} \cdot \lceil R_{PUCCH}/8 \rceil}{N_{CCE,p}} \right\rfloor + \Delta_{PRI} \cdot \\ \left\lceil \dfrac{R_{PUCCH}}{8} \right\rceil + R_{PUCCH} + N_{offset} + R_{PUCCH} & \bmod 8 \text{ if } \Delta_{PRI} \geq R_{PUCCH} \bmod 8 \end{cases}$$

[7]

(Equation 7)

$$r_{PUCCH} = \begin{cases} \left\lfloor \dfrac{n_{CCE,p} \cdot \lceil R_{PUCCH}/8 \rceil}{N_{CCE,p}} \right\rfloor + \\ \Delta_{PRI} \dfrac{8}{2^N} \cdot \lceil R_{PUCCH}/8 \rceil & \text{if } \Delta_{PRI} < R_{PUCCH} \bmod 8 \\ \left\lfloor \dfrac{n_{CCE,p} \cdot \lceil R_{PUCCH}/8 \rceil}{N_{CCE,p}} \right\rfloor + \\ \Delta_{PRI} \dfrac{8}{2^N} \cdot \left\lceil \dfrac{R_{PUCCH}}{8} \right\rceil + R_{PUCCH} & \bmod 8 \text{ if } \Delta_{PRI} \geq R_{PUCCH} \bmod 8 \end{cases}$$

Where, $N_{offset}$ indicates the offset value illustrated in FIG. 11. Incidentally, although FIG. 11 illustrates a case where $N_{offset}=4$, the value of $N_{offset}$ is not limited to four and may be another value.

Incidentally, in FIGS. 10 to 12, a case where the number of PRI bits N=1 has been described as an example, the number of PRI bits N may be another value different from one. For example, when N=2, two (=ceiling ($R_{PUCCH}/8$) pieces) PUCCH resources may be mapped to each of four PRI values (e.g., 0 to 3).

Thus, terminal 200 can identify the PUCCH resource based on the number of PRI bits when the number of PRI bits included in DCI is variable.

In addition, the mapping between the combination of a PRI value and a CCE number, and a PUCCH resource is not limited to the above-described examples. By way of example, PUCCH resources (e.g., PUCCH resources of ceiling ($R_{PUCCH}/8$)*$2^N$ pieces) included in the PUCCH resource set and the PRI value (values taking $2^N$ ways) may be mapped to each other in a manner of ceiling ($R_{PUCCH}/8$) pieces to one while PUCCH resources of ceiling ($R_{PUCCH}/8$) pieces that have been mapped to each of the PRI values may be mapped to a CCE group in a one-to-one manner. Here, one CCE group is a union including CCE numbers of one/floor (ceiling ($R_{PUCCH}/8$)/$N_{CCE,p}$) pieces (e.g., CCEs 0 to 15 or CCEs 16 to 31 in FIGS. 10 to 12).

In addition, the mapping between the combination of a PRI value and a CCE number, and a PUCCH resource may be defined by standards or may be indicated to terminal 200 in advance by the higher layer signalling, for example. Further, for example, in a case of the example illustrated in FIG. 11 (Equation 6), the offset value ($N_{offset}$) may be defined by standards or may be indicated to terminal 200 in advance by the higher layer signalling.

According to the present embodiment, terminal 200 controls the PUCCH resource allocation to UCI based on the size of PRI indicating the resource allocation with respect to UCI such as ACK/NACK. For example, in a case where the number of PRI bits included in DCI is variable, terminal 200 can determine the PUCCH resource to be allocated to terminal 200 among PUCCH resources included in the PUCCH resource set, based on a PRI value or the combination of a PRI value and a CCE number. Thus, according to the present embodiment, for example, it is possible to improve the efficiency of the PUCCH resource allocation in accordance with the variable number of PRI bits.

Note that, for example, a configuration of the mapping between a PRI value and a PUCCH resource (e.g., FIGS. 7 to 9) or a configuration of the mapping between the combination of a PRI value and a CCE number, and a PUCCH resource (e.g., FIGS. 10 to 12) may differ between terminals 200. Applying a different mapping among terminals makes it possible to, for example, increase the number of PUCCH resources that can be allocated at the same time to plural terminals 200 sharing the PUCCH resource set.

Embodiment 2

In Embodiment 1, for example, when the number of PRI bits is N, the number of PUCCH resources that can be dynamically allocated by the PRI value or the combination of a PRI value and a CCE number is $2^N$ in a case where the number of PUCCH resources in the PUCCH resource set is equal to or less than eight whereas the number of PUCCH resources is ceiling ($R_{PUCCH}/8$)*$2^N$ in a case where the number of PUCCH resources in the PUCCH resource set is greater than eight. Hence, for example, the smaller the number of PRI bits N is, the smaller the number of PUCCH resources dynamically allocatable is.

For example, in a case where the smaller the number of PRI bits N is, the smaller the number of PUCCH resources simultaneously allocable to a plurality of terminals is, when the terminals share the PUCCH resource set, so that a PUCCH resource conflict easily occurs. The PUCCH resource conflict may cause an increase in the occurrence frequency of blocking. On the other hand, in a case where a different PUCCH resource set is configured for each of the plurality of terminals, the blocking frequency may decrease; however, an overhead of a PUCCH resource may be increased.

Further, for example, a different configuration can be applied to each of a plurality of terminals with respect to the configuration of the mapping between a PRI value and a PUCCH resource or the configuration of the mapping between the combination of a PRI value and a CCE number, and a PUCCH resource. However, when the different configuration of the mapping is applied to each of plurality of the terminals, an overhead for indicating the different configuration of the mapping to each of the terminals may increase.

Therefore, in the present embodiment, for example, a description will be given of a method for dynamically allocating a plurality of PUCCH resources included in a PUCCH resource set without depending on the number of PUCCH resources included in the PUCCH resource set and the number of PRI bits.

The configurations of the base station and the terminal according to the present embodiment may be the same as the configurations of base station 100 and terminal 200 according to Embodiment 1.

Figure 13:
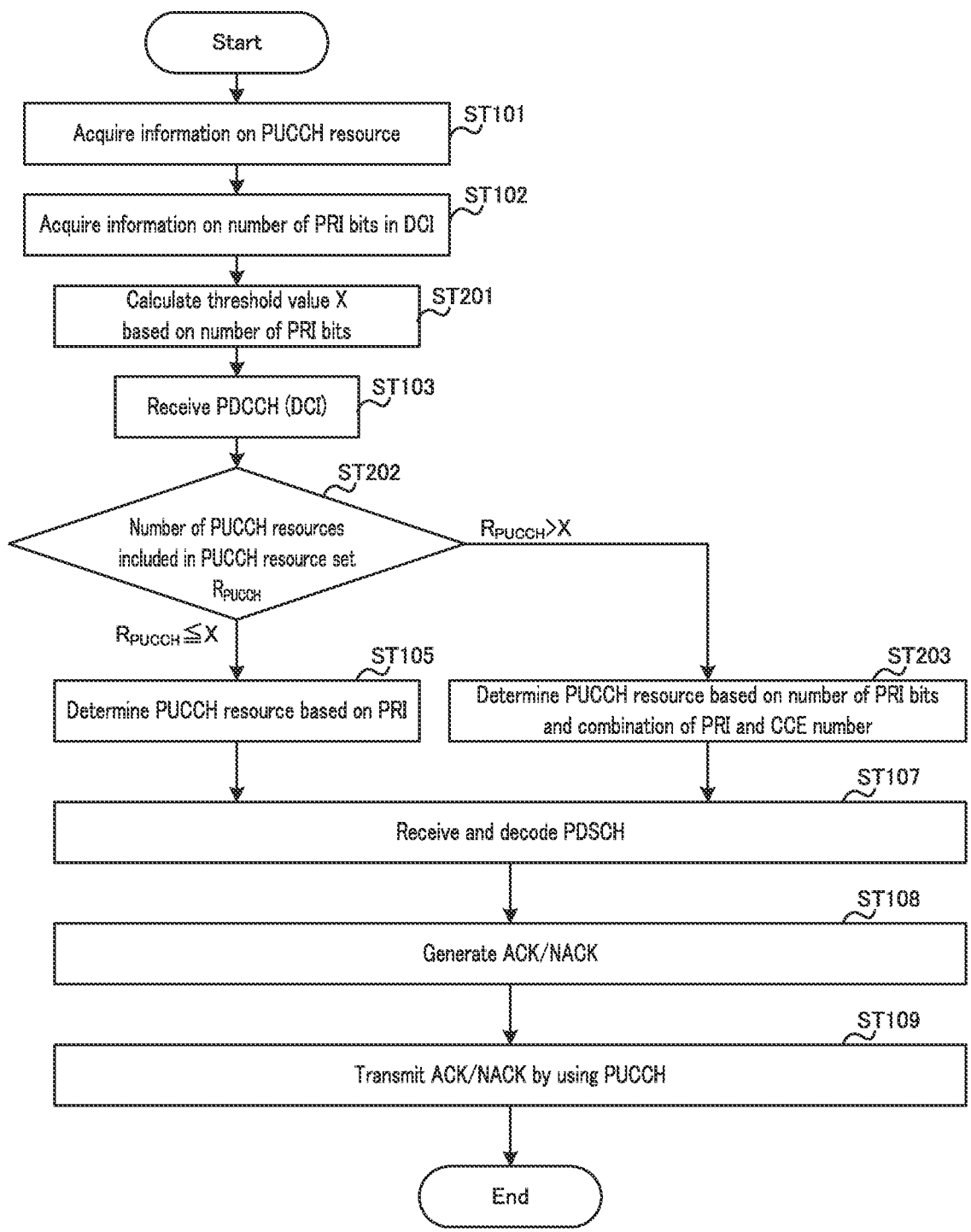
FIG. 13 is a flowchart illustrating an operation example of a terminal according to Embodiment 2.

FIG. 13 is a flowchart illustrating an operation example of terminal 200 according to the present embodiment. Note that, in FIG. 13, an operation the same as in FIG. 6 (Embodiment 1) is given the same reference numeral, and the description thereof will be omitted.

In FIG. 13, terminal 200 determines (e.g., calculates) a parameter relating to control for PUCCH resource allocation based on, for example, the number of PRI bits (N) (ST201). The parameter related to the control for the PUCCH resource allocation is, for example, threshold value X for the number of PUCCH resources included in the PUCCH resource set ($R_{PUCCH}$). For example, threshold value X may be set to $2^N$. With this configuration, threshold value X is set to a smaller as the number of PRI bits N is smaller.

Terminal 200 then compares, for example, the number of PUCCH resources included in the PUCCH resource set ($R_{PUCCH}$) with the determined threshold value X (here, $2^N$) (ST202).

In a case where the number of PUCCH resources included in the PUCCH resource set ($R_{PUCCH}$) is equal to or less than X, terminal 200 determines the PUCCH resource based on the PRI value (ST105). For example, terminal 200 may determine, as the PUCCH resource allocated to terminal 200, a PUCCH resource mapped to the PRI value in a one-to-one manner, among the PUCCH resources included in the PUCCH resource set.

On the other hand, in a case where the number of PUCCH resources included in the PUCCH resource set ($R_{PUCCH}$) is greater than X, terminal 200 determines the PUCCH resource based on the number of PRI bits N and a combination of a PRI value and a CCE number used for the received PDCCH (e.g., first CCE number) (ST203). For example, terminal 200 may determine, among the PUCCH resources included in the PUCCH resource set, a PUCCH resource mapped to the combination of a PRI value and a CCE number as the PUCCH resource allocated to terminal 200. In this case, a configuration of the mapping between the combination of a PRI value and a CCE number, and a PUCCH resource may differ depending on the number of PRI bits N (example will be described later).

Thus, in the present embodiment, terminal 200 determines the allocation method for the PUCCH resource according to the comparison result between the number of PUCCH resources (i.e., PUCCH resource candidates) included in the PUCCH resource set and threshold value X based on the number of PRI bits.

[Allocation Example for PUCCH Resource]

Next, an exemplary allocation method (i.e., determination method) for a PUCCH resource according to the present embodiment will be described.

In the present embodiment, terminal 200 controls PUCCH resource allocation based on, for example, the number of PRI bits included in DCI (e.g., N).

For example, in the control for the PUCCH resource allocation, terminal 200 may determine (in other words, switch), based on the number of PRI bits, the method to be applied among a plurality of PUCCH resource allocation methods.

Examples of PUCCH resource allocation methods can include, for example, PUCCH resource control based on PRI and PUCCH resource control based on a combination of PRI and a CCE number. The PUCCH resource control based on PRI may be, for example, control by an explicit indication of a PUCCH resource. The PUCCH resource control based on the combination of PRI and a CCE number may be, for example, control by a combination of the control by the explicit indication of a PUCCH resource and control by an implicit indication of a PUCCH resource.

Further, for example, terminal 200 may determine, in the PUCCH resource control based on the combination of PRI and a CCE number, a mapping between a PRI value and a CCE number on one hand and the PUCCH resource on the other hand, based on the number of PRI bits.

Examples of PUCCH resource allocation methods based on the PRI value and the CCE number may include a mapping between a PRI value and a PUCCH resource and a mapping between a CCE number and a PUCCH resource, for example.

For example, information on the mapping between a PRI value and a PUCCH resource may be the number of PUCCH resources mapped to one PRI value. By way of example, in the mapping between a PRI value and a PUCCH resource, the number of PUCCH resources mapped to each PRI value may be different for each number of PRI bits N.

Further, for example, information on the mapping between a CCE number and a PUCCH resource may be the number of CCEs included in the CCE group mapped to the PUCCH resource in a one-to-one manner. By way of example, in the mapping between a CCE number and a PUCCH resource, the number of CCEs mapped to the PUCCH resource in a one-to-one manner may be different for each number of PRI bits N.

As an example, terminal 200 supports reception of DCI in which the number of PRI bits (e.g., N bits) is configured to be variable (e.g., configurable with any of zero, one, two, and three bits).

For example, terminal 200 performs either of the PUCCH resource control based on PRI of N bits or the PUCCH resource control based on the combination of a PRI value and a CCE number, according to a comparison result between the number of PUCCH resources $R_{PUCCH}$ and threshold value X.

In the present embodiment, threshold value X is set based on, for example, the number of PRI bits N. In one example, when threshold value X is set to $2^N$, as the number of PRI bits becomes larger (smaller), threshold value X increases (decreases). Note that, threshold value X is not limited to the case of being set to $2^N$ and may be, for example, another value determined based on the number of PRI bits N.

[Case Where Number of PUCCH Resources Included in PUCCH Resource Set is Equal to or Less than X]

In a case where $R_{PUCCH}$, which is the number of PUCCH resources included in the PUCCH resource set, is equal to or less than threshold value X, terminal 200 may identify the PUCCH resource mapped, in a one-to-one manner, to the PRI value included in DCI, from among the PUCCH resources included in the PUCCH resource set.

Figure 14:
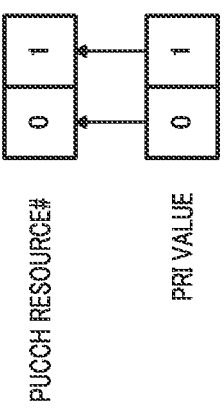
FIG. 14 illustrates an example of PUCCH resource allocation according to Embodiment 2.

FIG. 14 illustrates an example of PUCCH resource allocation (mapping between PRI values and PUCCH resources) when N=one bit (e.g., PRI=0 or 1) and the number of PUCCH resources included in the PUCCH resource set is set, $R_{PUCCH}=2$. In FIG. 14, threshold value $X=2^N=2$, and $R_{PUCCH}$, which is the number of PUCCH resources, is equal to or less than threshold value X.

As illustrated in FIG. 14, the PRI values ($\Delta_{PRI}$) 0 and 1 are respectively mapped to PUCCH resources 0 and 1 in a one-to-one manner. In FIG. 14, for example, terminal 200 determines, as the PUCCH resource to be allocated to terminal 200, PUCCH resource 0 when the PRI value included in DCI is 0 and determines PUCCH resource 1 when the PRI value included in DCI is 1.

In FIG. 14, as an example, the case has been described where the number of PRI bits N=1 and the number of PUCCHs $R_{PUCCH}=2$, but the number of PRI bits N may be another value different from one, and the number of PUCCHs $R_{PUCCH}$ may be another value different from two. For example, when N=2, four ($=2^N$) PUCCH resources may be mapped to four PRI values (e.g., 0 to 3) in a one-to-one manner, as long as the number of PUCCHs $R_{PUCCH}$ is equal to or less than $2^N=4$.

In the present embodiment, the PUCCH resource control based on the PRI value (e.g., one-to-one mapping between PRI value and PUCCH resource) is applied when the number of PUCCHs $R_{PUCCH}$ is equal to or less than $2^N$. In other words, the PUCCH resource control based on the PRI value is applied when the PRI values and a plurality of PUCCH resources included in the PUCCH resource set can be mapped to each other respectively in a one-to-one manner. Therefore, when the number of PRI bits included in DCI is variable, it is possible to dynamically allocate, to terminal 200, the plurality of PUCCH resources included in the PUCCH resource set that has been configured for terminal 200. In other words, it is possible to suppress unallocation of some PUCCH resources in the PUCCH resource set to terminal 200.

[Case Where Number of PUCCH Resources Included in PUCCH Resource Set is Greater than X]

In a case where the number of PUCCH resources included in the PUCCH resource set ($R_{PUCCH}$) is greater than threshold value X, terminal 200 may identify the PUCCH resource from among the PUCCH resources included in the PUCCH resource set, based on, for example, information on PRI included in DCI and on CCE of PDCCH including DCI.

For example, the PUCCH resource number ($r_{PUCCH}$) may be given by following Equation 8.

transmitting DCI, and Amar indicates the PRI value. As illustrated in Equation 8, PUCCH resource number $r_{PUCCH}$ can be set to a different value depending on the number of PRI bits.

Figure 15:
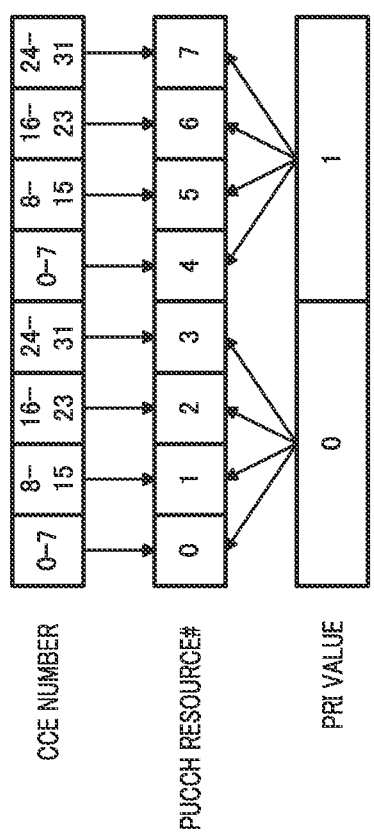
FIG. 15 illustrates another example of the PUCCH resource allocation according to Embodiment 2.

FIG. 15 illustrates an example of PUCCH resource allocation (mapping between PRI values and CCE numbers on one hand and PUCCH resources on the other hand) when N=one bit (e.g., $\Delta_{PRI}=0$ or 1) and the number of PUCCH resources included in the PUCCH resource set is set, $R_{PUCCH}=8$. Moreover, in FIG. 15, $N_{CCE,p}$, which is the number of CCEs, is 32.

As illustrated in FIG. 15, PUCCH resources 0 to 3 are mapped to PRI=0, and PUCCH resources 4 to 7 are mapped to PRI=1. That is, four PUCCH resources are mapped to one PRI value.

Further, as illustrated in FIG. 15, among the PUCCH resources mapped to PRI=0, PUCCH resource 0 is mapped to a CCE group having CCE numbers 0 to 7. PUCCH resource 1 is mapped to a CCE group having CCE numbers 8 to 15, PUCCH resource 2 is mapped to a CCE group having CCE numbers 16 to 23, and PUCCH resource 3 is mapped to a CCE group having CCE numbers 24 to 31. Similarly, in FIG. 15, among the PUCCH resources mapped to PRI=1, PUCCH resource 4 is mapped to the CCE group having CCE numbers 0 to 7, PUCCH resource 5 is mapped to the CCE group having CCE numbers 8 to 15, PUCCH resource 6 is mapped to a CCE group having CCE numbers 16 to 23, and PUCCH resource 7 is mapped to a CCE group having CCE numbers 24 to 31.

In FIG. 15, for example, terminal 200 determines, as the PUCCH resource to be allocated to terminal 200, a PUCCH resource mapped to a combination of a PRI value included in DCI ($\Delta_{PRI}$) and a CCE number (e.g., first CCE number) used for transmission of PDCCH including DCI, among PUCCH resources 0 to 7 included in the PUCCH resource set.

Figure 16:
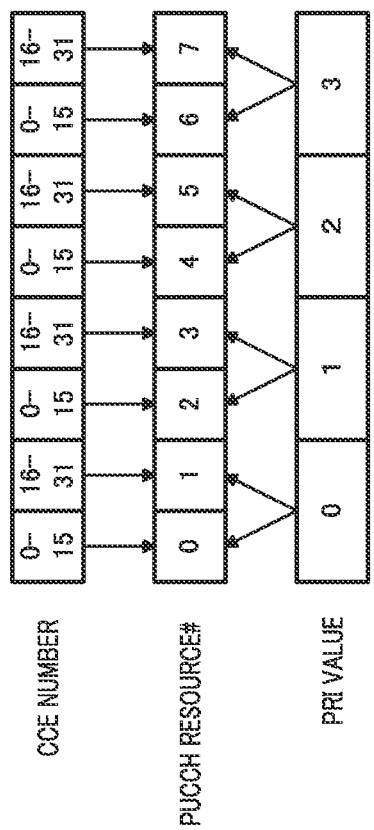
FIG. 16 illustrates still another example of the PUCCH resource allocation according to Embodiment 2.

Incidentally, in FIG. 15, a case where the number of PRI bits N=1 has been described as an example, the number of PRI bits N may be another value different from one. In one example, FIG. 16 illustrates an example of PUCCH resource allocation when N=two bits (e.g., any of $\Delta_{PRI}=0$ to 3), the number of PUCCH resources included in the PUCCH resource set is set, $R_{PUCCH}=8$, and the number of CCEs is set, $N_{CCE,p}=32$. As illustrated in FIG. 16, when N=2, two (=ceiling ($R_{PUCCH}/8$) pieces) PUCCH resources may be mapped to each of four PRI values (e.g., 0 to 3) and a CCE group composed of eight CCEs (CCEs 0 to 15 or CCEs 16 to 31) is mapped to the two PUCCH resources.

As illustrated in FIGS. 15 and 16, when the number of PUCCH resources in the PUCCH resource set ($R_{PUCCH}$) is

[8]

$$r_{PUCCH} = \begin{cases} \left\lfloor \frac{n_{CCE,p} \cdot \lfloor R_{PUCCH}/2^N \rfloor}{N_{CCE,p}} \right\rfloor + \Delta_{PRI} \cdot \lceil R_{PUCCH}/2^N \rceil & \text{if } \Delta_{PRI} < R_{PUCCH} \bmod 2^N \\ \left\lfloor \frac{n_{CCE,p} \cdot \lfloor R_{PUCCH}/2^N \rfloor}{N_{CCE,p}} \right\rfloor + \Delta_{PRI} \cdot \left\lfloor \frac{R_{PUCCH}}{2^N} \right\rfloor + R_{PUCCH} \bmod 2^N & \text{if } \Delta_{PRI} \geq R_{PUCCH} \bmod 2^N \end{cases}$$

(Equation 8)

Where, $N_{CCE,p}$ indicates the number of CCEs included in Control resource set (p) for transmitting PDCCH, $n_{CCE,p}$ indicates the first CCE number assigned to PDCCH for greater than threshold value X, as the number of PRI bits N becomes smaller, the number of PUCCH resources mapped to one PRI value increases whereas the number of CCEs included in the CCE group mapped to the PUCCH resource in a one-to-one manner decreases.

Therefore, when the number of PRI bits N included in DCI is variable, terminal 200 can dynamically allocate, to terminal 200, the plurality of PUCCH resources included in the PUCCH resource set, by controlling the mapping between a PRI value and a PUCCH resource based on the number of PRI bits and the mapping between a CCE number and a PUCCH resource based on the number of PRI bits N. In other words, it is possible to suppress unallocation of some PUCCH resources in the PUCCH resource set to terminal 200.

According to the present embodiment, terminal 200 controls PUCCH resource allocation based on the number of PRI bits.

For example, terminal 200 determines threshold value X based on the number of PRI bits. That is, threshold value X varies (i.e., increases or decreases) depending on the number of PRI bits N. Thus, the number PUCCH resources $R_{PUCCH}$ when the PUCCH resource control based on the PRI value is applied may vary with the number PRI bits N, for example. In one example, the fewer the number PRI bits N is, the fewer the number of values that PRI can take is, which further reduces the number of PUCCH resources $R_{PUCCH}$ to which the PUCCH resource control based on the PRI value can be applied.

Further, terminal 200 determines the configuration of the mapping between a PRI and a PUCCH resource (e.g., number of PUCCH resources mapped to one PRI value) and the configuration of the mapping between a CCE number and a PUCCH resource (e.g., number of CCEs composing CCE group mapped to one PUCCH resource), based on the number of PRI bits. Thus, for example, as illustrated in FIGS. 15 and 16, a PUCCH resource to be mapped to the combination of a PRI value and a CCE number can be configured to be variable depending on the number of PRI bits N.

With this control, for example, base station 100 can dynamically allocate a plurality of PUCCH resources (e.g., all PUCCH resources) included in the PUCCH resource set to terminal 200 without depending on the number of PUCCH resources included in the PUCCH resource set and the number of PRI bits. In contrast, terminal 200 can control, according to, for example, the number of PRI bits that has been configured, the dynamic PUCCH resource allocation based on PRI included in DCI (or combination of PRI and CCE number).

This allocation control ensures the flexibility in PUCCH resource allocation while sharing the PUCCH resource set between a plurality of terminals 200, for example. Further, according to the present embodiment, since the PUCCH resource set can be shared between a plurality of terminals 200, it is possible to suppress an increase in an overhead of a PUCCH resource as compared with a case where a different PUCCH resource set is configured for each of the plurality of terminals 200, for example.

Figure 17:
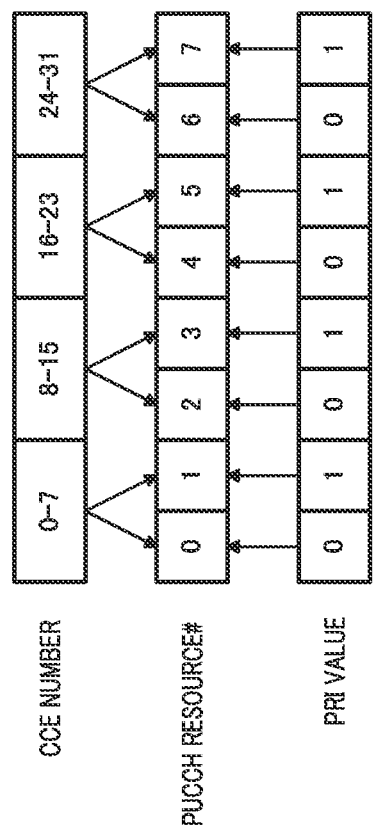
FIG. 17 illustrates yet another example of the PUCCH resource allocation according to Embodiment 2.

With respect to the mapping between the combination of a PRI value and a CCE number, and a PUCCH resource, the PRI values may be mapped to the PUCCH resources in this order from the beginning of PUCCH resources as illustrated in FIG. 15, or the PRI values may be alternately mapped from the beginning of the PUCCH resources as illustrated in FIG. 17. In the example of FIG. 17, a terminal supporting reception of DC in which the number of PRI bits is fixed (e.g., three bits) and terminal 200 can share PRI corresponding to PUCCH resource 0 and PUCCH resource 1, which is advantageous in that, for example, coexistence with the terminal supporting Rel. 15 is simplified.

In addition, the mapping between the combination of a PRI value and a CCE number, and a PUCCH resource is not limited to the above-described examples (e.g., FIG. 15, FIG. 16, or FIG. 17). By way of example, it is applicable as long as PUCCH resources of $R_{PUCCH}$ pieces included in the PUCCH resource set and the PRI value are mapped to each other in a manner of ceiling $(R_{PUCCH}/2^N)$ pieces to one while PUCCH resources of ceiling $(R_{PUCCH}/2^N)$ pieces that have been mapped to each of the PRI values may be mapped to a CCE group in a one-to-one manner. Here, one CCE group is a union including CCE numbers of one/floor (ceiling $(R_{PUCCH}/2^N)/N_{CCE,p})$ pieces.

In addition, the mapping between the combination of a PRI value and a CCE number, and a PUCCH resource may be defined by standards or may be indicated to terminal 200 in advance by the higher layer signalling, for example.

Embodiment 3

The configurations of the base station and the terminal according to the present embodiment may be the same as the configurations of base station 100 and terminal 200 according to Embodiment 1.

Figure 18:
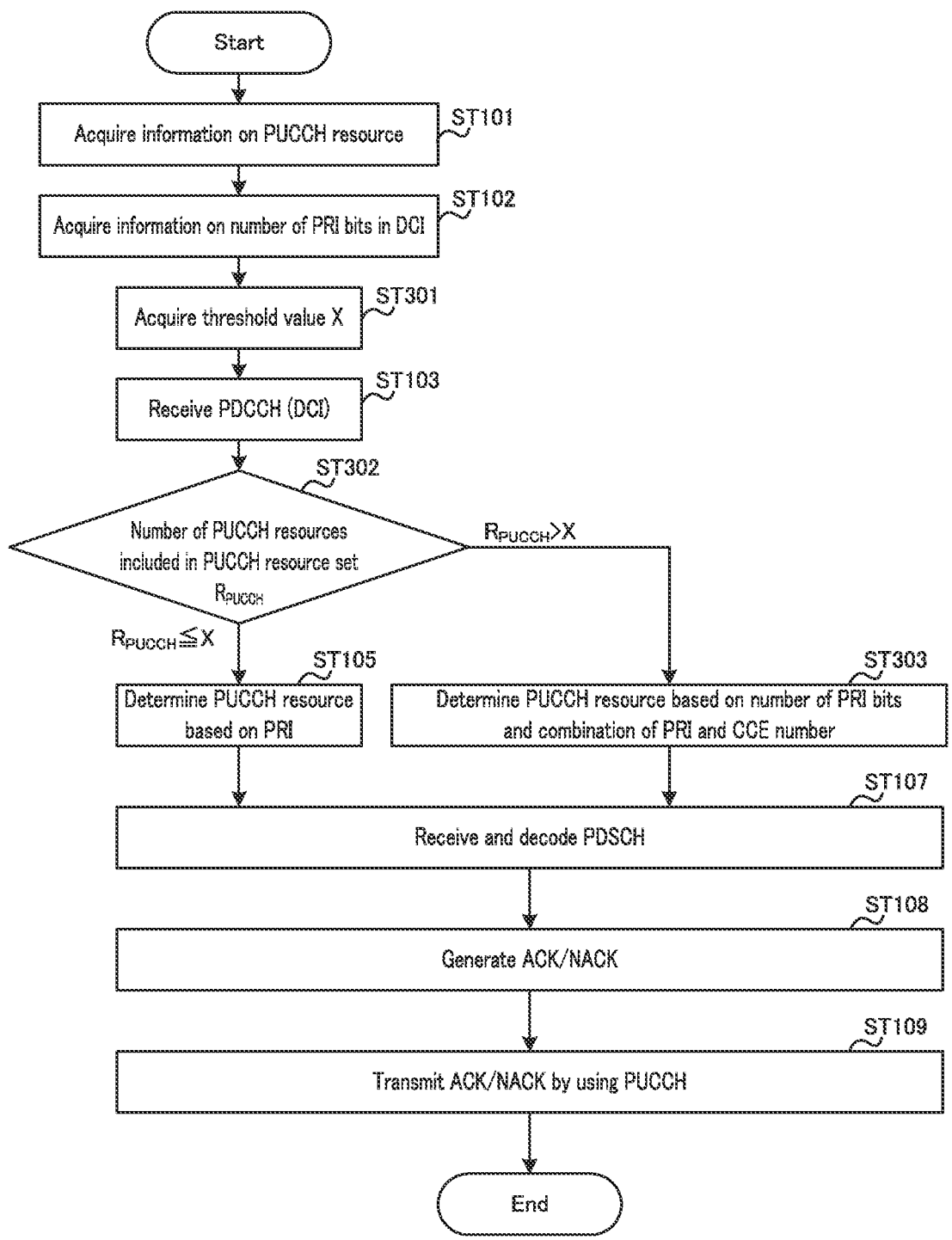
FIG. 18 is a flowchart illustrating an operation example of a terminal according to Embodiment 3.

FIG. 18 is a flowchart illustrating an operation example of terminal 200 according to the present embodiment. Note that, in FIG. 18, an operation the same as in FIG. 6 (Embodiment 1) is given the same reference numeral, and the description thereof will be omitted.

In FIG. 18, terminal 200 acquires, for example, a parameter (e.g., threshold value X for number of PUCCH resources $R_{PUCCH}$) relating to control for PUCCH resource allocation (ST301). In one example, threshold value X may be defined by standards or may be indicated to terminal 200 by the higher layer signalling. In the present embodiment, threshold value X may be, for example, eight as in Rel. 15 or may be another value. That is, threshold value X may be a threshold value that does not depend on the number of PRI bits.

Terminal 200 then compares, for example, the number of PUCCH resources included in the PUCCH resource set ($R_{PUCCH}$) with the acquired threshold value X (ST302).

In a case where the number of PUCCH resources included in the PUCCH resource set ($R_{PUCCH}$) is equal to or less than X, terminal 200 determines the PUCCH resource based on the PRI value (ST105). For example, terminal 200 may determine, as the PUCCH resource allocated to terminal 200, a PUCCH resource mapped to the PRI value in a one-to-one manner, among the PUCCH resources included in the PUCCH resource set.

On the other hand, in a case where the number of PUCCH resources included in the PUCCH resource set ($R_{PUCCH}$) is greater than X, terminal 200 determines the PUCCH resource based on the number of PRI bits N and a combination of a PRI value and a CCE number used for the received PDCCH (e.g., first CCE number) (ST303). For example, terminal 200 may determine, among the PUCCH resources included in the PUCCH resource set, a PUCCH resource mapped to the combination of a PRI value and a CCE number as the PUCCH resource allocated to terminal 200. In this case, a configuration of the mapping between the combination of a PRI value and a CCE number, and a PUCCH resource may differ depending on the number of PRI bits N (example will be described later).

[Allocation Example for PUCCH Resource]

Next, an exemplary allocation method (i.e., determination method) for a PUCCH resource according to the present embodiment will be described.

As an example, terminal 200 supports reception of DCI in which the number of PRI bits (e.g., N bits) is configured to be variable (e.g., configurable with any of zero, one, two, and three bits).

For example, terminal 200 performs either of PUCCH resource control based on PRI or PUCCH resource control based on the combination of a PRI value and a CCE number, according to a comparison result between $R_{PUCCH}$, which is the number of PUCCH resources included in the PUCCH resource set, and threshold value X.

Threshold value X may be, for example, a fixed value. In one example, threshold value X may be a value that does not depend on the number of PRI bits and may be set to X=8 as in Rel. 15, for example.

In a case where the number of PUCCH resources included in the PUCCH resource set is greater than X, for example, terminal 200 may identify, as illustrated in FIG. 15 (or FIG. 16 or FIG. 17), the PUCCH resource from among the PUCCH resources included in the PUCCH resource set, based on information on PRI included in DCI and on CCE of PDCCH including DCI. For example, terminal 200 may identify the PUCCH resource according to Equation 8.

In other words, when the number of PUCCH resources $R_{PUCCH}$ is greater than threshold value X, terminal 200 may apply the same operation as in the case of Embodiment 2 where $R_{PUCCH}$ is greater than X. For example, terminal 200 may control, according to the number of PRI bits (e.g., N) included in DCI, the PUCCH resource allocation based on the combination of PRI and a CCE number (e.g., mapping between PRI value and PUCCH resource or mapping between CCE number and PUCCH resource). As in Embodiment 2, the information on the mapping between a PRI value and a PUCCH resource may be, for example, the number of PUCCH resources mapped to one PRI value. Further, as in Embodiment 2, the information on the mapping between a CCE number and a PUCCH resource may be, for example, the number of CCEs included in the CCE group mapped to the PUCCH resource in a one-to-one manner. The number of PUCCH resources mapped to one PRI value and the number of CCEs included in the CCE group mapped to the PUCCH resource in a one-to-one manner may be different for each number of PRI bits N, for example.

On the other hand, when $R_{PUCCH}$, which is the number of PUCCH resources included in the PUCCH resource set, is equal to or less than threshold value X, for example, as illustrated in any of FIGS. 7 to 9, terminal 200 may identify the PUCCH resource mapped, in a one-to-one manner, to the PRI value included in DCI, from among the PUCCH resources included in the PUCCH resource set. In other words, in a case where the number of PUCCH resources $R_{PUCCH}$ is equal to or less than threshold value X, terminal 200 may apply the same operation as in the case of Embodiment 1 where $R_{PUCCH}$ is equal to or less than eight. Thus, in the present embodiment, terminal 200 need not depend on the number of PRI bits N in, for example, the control for the PUCCH resource allocation based on PRI.

Here, in NR, for example, the configuration relating to the number of DCI bits (e.g., number of PRI bits) and the configuration relating to a PUCCH resource (e.g., PUCCH resource set) may be configured separately from each other. In the present embodiment, terminal 200 determines whether to apply the PUCCH resource allocation based on the CCE number according to a fixed threshold X without depending on the number of DCI bits (e.g., number of PRI bits).

In other words, when determining the PUCCH resource allocation method, terminal 200 need not execute the process for comparing a value based on the configuration for the number of DCI bits (e.g., value based on number of PRI bits N) with a value based on the configuration for the PUCCH resource (e.g., $R_{PUCCH}$). This makes it possible to simplify the processing of terminal 200.

Further, in the present embodiment, terminal 200 can control the PUCCH resource allocation according to, for example, the same criteria as in Rel. 15 NR (e.g., X=8) without depending on the number of PUCCH resources included in the PUCCH resource set.

Embodiment 4

In the present embodiment, for example, as in Embodiment 3, a case will be described where a fixed threshold value (e.g., eight as in Rel. 15) is applied with respect to a criterion for switching between the PUCCH resource control based on PRI (i.e., explicit PUCCH resource control) and the PUCCH resource control based on the combination of PRI and a CCE number (i.e., combination of explicit PUCCH resource control and implicit PUCCH resource control).

The present embodiment will further give a description of an example in which the implicit PUCCH resource control is applied when the number of PUCCH resources included in the PUCCH resource set is equal to or less than the threshold value and the number of PRI bits is a specific number of bits (e.g., zero bits).

The configurations of the base station and the terminal according to the present embodiment may be the same as the configurations of base station 100 and terminal 200 according to Embodiment 1.

Figure 19:
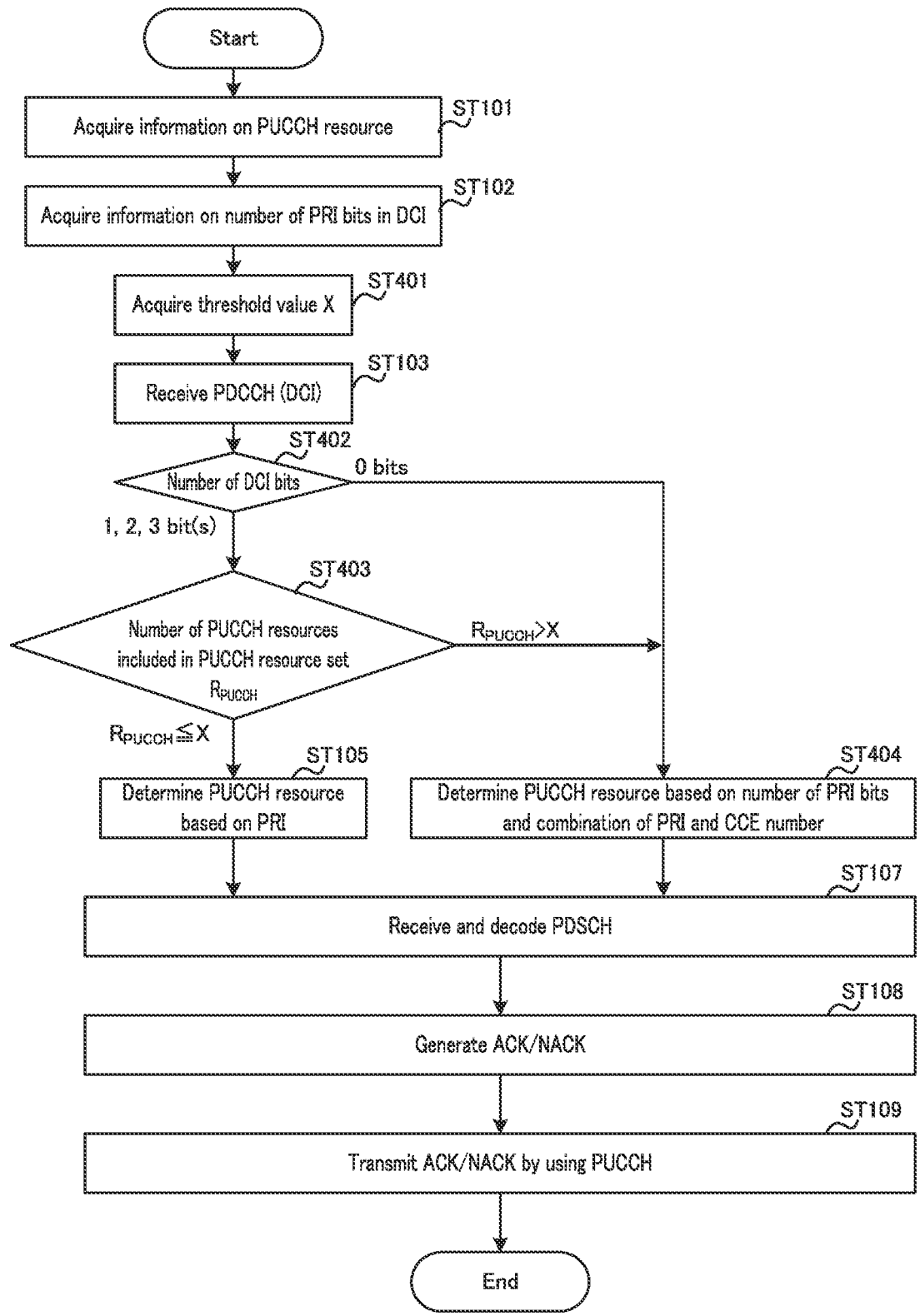
FIG. 19 is a flowchart illustrating an operation example of a terminal according to Embodiment 4.

FIG. 19 is a flowchart illustrating an operation example of terminal 200 according to the present embodiment. Note that, in FIG. 19, an operation the same as in FIG. 6 (Embodiment 1) is given the same reference numeral, and the description thereof will be omitted.

In FIG. 19, terminal 200 acquires, for example, a parameter (e.g., threshold value X for number of PUCCH resources $R_{PUCCH}$) relating to control for PUCCH resource allocation (ST401). In one example, threshold value X may be defined by standards or may be indicated to terminal 200 by the higher layer signalling. Threshold value X may be, for example, eight as in Rel. 15 or may be another value.

Terminal 200 determines whether the number of DCI bits (e.g., number of PRI bits N) is a specific value (e.g., zero bits) (ST402). Note that, the specific number of bits may be defined by standards or may be indicated to terminal 200 by the higher layer signalling (e.g., information on DCI reception).

In addition, when the number of DCI bits is not the specific value (in FIG. 19, either N=one, two, or three bits), terminal 200 compares, for example, the number of PUCCH resources included in the PUCCH resource set ($R_{PUCCH}$) and the acquired threshold value X with each other (ST403).

In a case where the number of DCI bits is not the specific value and the number of PUCCH resources ($R_{PUCCH}$) is equal to or less than X, terminal 200 determines the PUCCH resource based on the PRI value (ST105). For example, terminal 200 may determine, as the PUCCH resource allocated to terminal 200, a PUCCH resource mapped to the PRI value in a one-to-one manner, among the PUCCH resources included in the PUCCH resource set.

On the other hand, in a case where the number of DCI bits is the specific value or the number of PUCCH resources ($R_{PUCCH}$) is greater than X, terminal 200 determines the PUCCH resource based on the number of PRI bits N and a combination of a PRI value and a CCE number used for the received PDCCH (e.g., first CCE number) (ST404). For example, terminal 200 may determine, among the PUCCH resources included in the PUCCH resource set, a PUCCH resource mapped to the combination of a PRI value and a CCE number, as the PUCCH resource allocated to terminal 200. Additionally, in a case where the number of DCI bits is the specific value, for example, terminal 200 may determine, among the PUCCH resources included in the PUCCH resource set, a PUCCH resource mapped to the CCE number as the PUCCH resource allocated to terminal 200. Configuration of the mapping in between with these PUCCH resources may differ depending on the number of PRI bits N (example will be described later).

[Allocation Example for PUCCH Resource]

Next, an exemplary allocation method (i.e., determination method) for a PUCCH resource according to the present embodiment will be described.

As an example, terminal 200 supports reception of DCI in which the number of PRI bits is configured to be variable (e.g., configurable with any of zero, one, two, and three bits).

For example, terminal 200 performs either of PUCCH resource control based on PRI or PUCCH resource control based on the combination of a PRI value and a CCE number, according to a comparison result between $R_{PUCCH}$, which is the number of PUCCH resources included in the PUCCH resource set, and threshold value X.

Threshold value X may be, for example, a fixed value. In one example, threshold value X may be a value that does not depend on the number of PRI bits and may be set to X=8 as in Rel. 15, for example.

In a case where $R_{PUCCH}$, which is the number of PUCCH resources included in the PUCCH resource set, is equal to or less than threshold value X and the number of PRI bits N is not a specific number of bits, for example, as illustrated in any of FIGS. 7 to 9, terminal 200 may identify the PUCCH resource mapped, in a one-to-one manner, to the PRI value included in DCI, from among the PUCCH resources included in the PUCCH resource set. In other words, when the number of PUCCH resources $R_{PUCCH}$ is equal to or less than threshold value X and the number of PRI bits N is not the specific number of bits, terminal 200 may apply the same operation as in the case of Embodiment 1 where $R_{PUCCH}$ is equal to or less than eight.

On the other hand, in a case where the number of PUCCH resources included in the PUCCH resource set is greater than threshold value X or the number of PRI bits N is a specific number of bits, terminal 200 may identify the PUCCH resource based on at least one kind of information on PRI included in DCI and CCE of PDCCH including DCI, as illustrated in FIG. 15 (or FIG. 16 or FIG. 17), for example. In one example, terminal 200 may identify the PUCCH resource according to Equation 8. In other words, when the number of PUCCH resources $R_{PUCCH}$ is greater than threshold value X and the number of PRI bits N is the specific number of bits, terminal 200 may apply the same operation as in the case of Embodiment 2 where $R_{PUCCH}$ is greater than X.

For example, in a case where the number of PUCCH resources included in the PUCCH resource set is greater than X and the number of PRI bits N is not the specific number of bits, terminal 200 may control, based on the number of PRI bits N, the mapping between the combination of a PRI value and a CCE number, and a PUCCH resource, as in Embodiment 2. This control allows terminal 200 to dynamically allocate the PUCCH resource according to the number of PRI bits N, and thus, the flexibility in PUCCH resource allocation can be ensured.

Further, for example, in a case where the number of PRI bits N is the specific number of bits (e.g., zero bits), terminal 200 may control the mapping of the combination of CCE numbers with a PUCCH resource, based on the PRI number of bits N. This control allows terminal 200 to dynamically allocate the PUCCH resource according to the number of PRI bits N when the number of PRI bits is zero bits, and thus, the flexibility in PUCCH resource allocation can be ensured.

Note that, the specific number of bits may be defined by standards (e.g., zero bits) or may be indicated to terminal 200 by the higher layer signalling. Further, the specific number of bits is not limited to zero bits and may be another number of bits.

Here, in NR, for example, the configuration relating to the number of DCI bits (e.g., number of PRI bits) and the configuration relating to a PUCCH resource (e.g., PUCCH resource set) may be configured separately from each other.

In the present embodiment, terminal 200 determines whether to apply the PUCCH resource allocation based on the CCE number (i.e., implicit PUCCH resource control) according to the number of DCI bits (e.g., number of PRI bits) (e.g., process in ST402 of FIG. 19). Meanwhile, in the present embodiment, terminal 200 determines whether to apply the PUCCH resource allocation based on the CCE number according to fixed threshold value X, without depending on the number of DCI bits (e.g., process in ST403 of FIG. 19). Therefore, when determining the PUCCH resource allocation method, terminal 200 need not execute the process for comparing a value based on the configuration for the number of DCI bits (e.g., value based on number of PRI bits N) with a value based on the configuration for the PUCCH resource (e.g., $R_{PUCCH}$). This makes it possible to simplify the processing of terminal 200.

Further, according to the present embodiment, since the PUCCH resource allocation based on the CCE number is applied in a case where the number of PRI bits N is equal to or less than threshold value X and the number of PRI bits N is the specific number of bits, the flexibility in PUCCH resource allocation can be improved as compared with Embodiment 3.

Variation of Embodiment 4

In the present embodiment, for example, the case has been described where terminal 200 applies the PUCCH resource allocation based on the CCE number in a case where the number of PRI bits N is the specific number of bits. As an example of this, a description has been given of the case where terminal 200 identifies the PUCCH resource according to Equation 8; however, in this variation, terminal 200 may determine the PUCCH resource according to, for example, Equation 5. Further, terminal 200 may determine the PUCCH resource according to Equation 5 when the number of PUCCH resources included in the PUCCH resource set is equal to or less than the threshold value, and may determine the PUCCH resource according to Equation 8 when the number of PUCCH resources included in the PUCCH resource set is greater than the threshold value.

According to the variation, for example, in a case where a terminal supporting reception of DCI in which the number of PRI bits is fixed (e.g., three bits) and terminal 200 share the PUCCH resource set, the mapping between a CCE number and a PUCCH resource can be unified between the terminals. This is advantageous in that, for example, coexistence of the terminal that supports the reception of DCI in which the number of PRI bits is fixed (e.g., terminal supporting Rel. 15) and terminal 200 is simplified Each embodiment according to an exemplary embodiment of the present disclosure has been described thus far.

Other Embodiments

1. In the embodiments described above, as an example, the case has been described where terminal 200 supports the reception of DCI in which the number of PRI bits is configured to be variable (e.g., configurable with any of zero, one, two, and three bits). Here, DCI in which the number of PRI bits is configured to be variable may be, for example, DCI Format 1-2 defined in NR Rel. 16 (e.g., see NPL 7).

Further, terminal 200 may receive, for example, another kind of DCI different from DCI Format 1-2. In this case, for example, terminal 200 may apply an operation based on any of the above-mentioned embodiments when PDSCH is assigned by DCI Format 1-2. On the other hand, terminal 200 may apply the operation illustrated in FIG. 1 or FIG. 2 when PDSCH is assigned by DCI different from DCI Format 1-2.

Further, for example, terminal 200 may determine the PUCCH resource allocation method based on the type of DCI Format. In one example, terminal 200 may apply the operation of Embodiment 2 when PDSCH is assigned by DCI Format 1-2 and may apply the operation of Embodiment 1 when PDSCH is assigned by DCI different from DCI Format 1-2. Note that, the operation to be applied is not limited to that of Embodiment 1 or Embodiment 2 and may be any operation of Embodiments 1 to 4.

2. In the embodiments described above, DCI may indicate, to terminal 200, information on the priority of ACK/NACK.

In this case, terminal 200 may determine the PUCCH resource allocation method based on, for example, the priority of ACK/NACK. By way of example, terminal 200 may apply the operation of Embodiment 2 when the priority of ACK/NACK is high and may apply the operation of Embodiment 1 when the priority of ACK/NACK is low. Note that, the operation to be applied is not limited to that of Embodiment 1 or Embodiment 2 and may be any operation of Embodiments 1 to 4.

Further, the priority of ACK/NACK may be explicitly indicated in, for example, in a priority information field of DCI, and/or may be implicitly indicated by another kind of information such as the DCI Format, the DCI size, the search space of PDCCH for transmitting DCI, or the Control resource set.

3. In the embodiments described above, PDCCH for transmitting DCI may be scrambled by RNTI such as UE-specific C-RNTI or MCS-C-RNTI.

In this case, terminal 200 may determine the PUCCH resource allocation method based on, for example, the type of RNTI. By way of example, terminal 200 may apply the operation of Embodiment 2 when PDCCH is scrambled by MCS-C-RNTI and may apply the operation of Embodiment 1 when PDCCH is scrambled by C-RNTI. Note that, the operation to be applied is not limited to that of Embodiment 1 or Embodiment 2 and may be any operation of Embodiments 1 to 4.

Further, the type of RNTI mapped to a PUCCH resource allocation method is not limited to MCS-C-RNTI or C-RNTI and may be another kind of RNTI. For example, a PUCCH resource allocation method may be mapped based on an expected coding rate when each kind of RNTI is used.

4. Base station 100, for example, may indicate (i.e., semi-statically configure for), to terminal 200, the PUCCH resource allocation method (i.e., which Embodiment to apply) by using the upper layer signal (e.g., RRC signal). For example, the operation application of Embodiment 2 is configured by the RRC signal whereas the operation application of Embodiment 1 is configured in a case of no indication of the PUCCH resource allocation method. Note that, the operation to be applied is not limited to that of Embodiment 1 or Embodiment 2 and may be any operation of Embodiments 1 to 4.

The other embodiments have been described thus far.

Incidentally, in the above-mentioned embodiments, although the case has been assumed, as an example, where the configuration relating to the number of DCI bits (e.g., number of PRI bits) and the configuration relating to a PUCCH resource are configured separately, the configuration relating to the number of PRI bits and the configuration relating to a PUCCH resource may be correlated with each other. In one example, the number of PRI bits may be determined (e.g., calculated) based on $R_{PUCCH}$, which is the number of PUCCH resources included in the PUCCH resource set. For example, the number of PRI bits N=ceiling ($\log_2 R_{PUCCH}$) may be determined for $R_{PUCCH}$, which is the number of PUCCH resources included in the PUCCH resource set.

Further, in the above-mentioned embodiments, the case has been described where the PUCCH resource allocation method is switched based on the threshold value. However, an exemplary embodiment of the present disclosure is not limited to this case, and, for example, the mapping between the combination of a PRI value and a CCE number, and a PUCCH resource may be configured based on $R_{PUCCH}$, which is the number of PUCCH resources included in the PUCCH resource set, and the number of PRI bits, without depending on the threshold value. By way of example, it is applicable as long as PUCCH resources of $R_{PUCCH}$ pieces included in the PUCCH resource set and the PRI value are mapped to each other in a manner of ceiling ($R_{PUCCH}/2^N$) pieces to one while PUCCH resources of ceiling ($R_{PUCCH}/2^N$) pieces that have been mapped to each of the PRI values may be mapped to a CCE group in a one-to-one manner. This PUCCH resource allocation enables dynamic PUCCH resource allocation according to the number of PRI bits without depending on the number of PUCCH resources included in the PUCCH resource set.

Further, in the above embodiments, the PUCCH resource allocation method to ACK/NACK (e.g., response signal to downlink data signal) has been described as an example, but an allocation target of the PUCCH resource is not limited to ACK/NACK. For example, the target may be uplink control information (UCI), such as CSI or SR, which are different from ACK/NACK, and/or may be an uplink data signal (e.g., PUSCH).

Further, in the embodiments described above, the uplink communication in which a signal is transmitted from the terminal to the base station has been assumed. However, an exemplary embodiment of the present disclosure is not limited to this and may be applied to communication between terminals (e.g., sidelink communication).

Further, the downlink control channel, the downlink data channel, the uplink control channel, and the uplink data channel are not limited to PDCCH, PDSCH, PUCCH, and PUSCH, respectively, but may be control channels with other names.

In addition, the parameters applied in the embodiments described above are merely examples and are not limited to these examples. For example, at least one of the number of PUCCH resources (e.g., $R_{PUCCH}=2$, 8, or 16), the number of CCEs (e.g., 32), and the number of PRI bits (e.g., any of N=0 to 3) included in the PUCCH resource set is not limited to the value in the embodiments described above and may be another value.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 20:
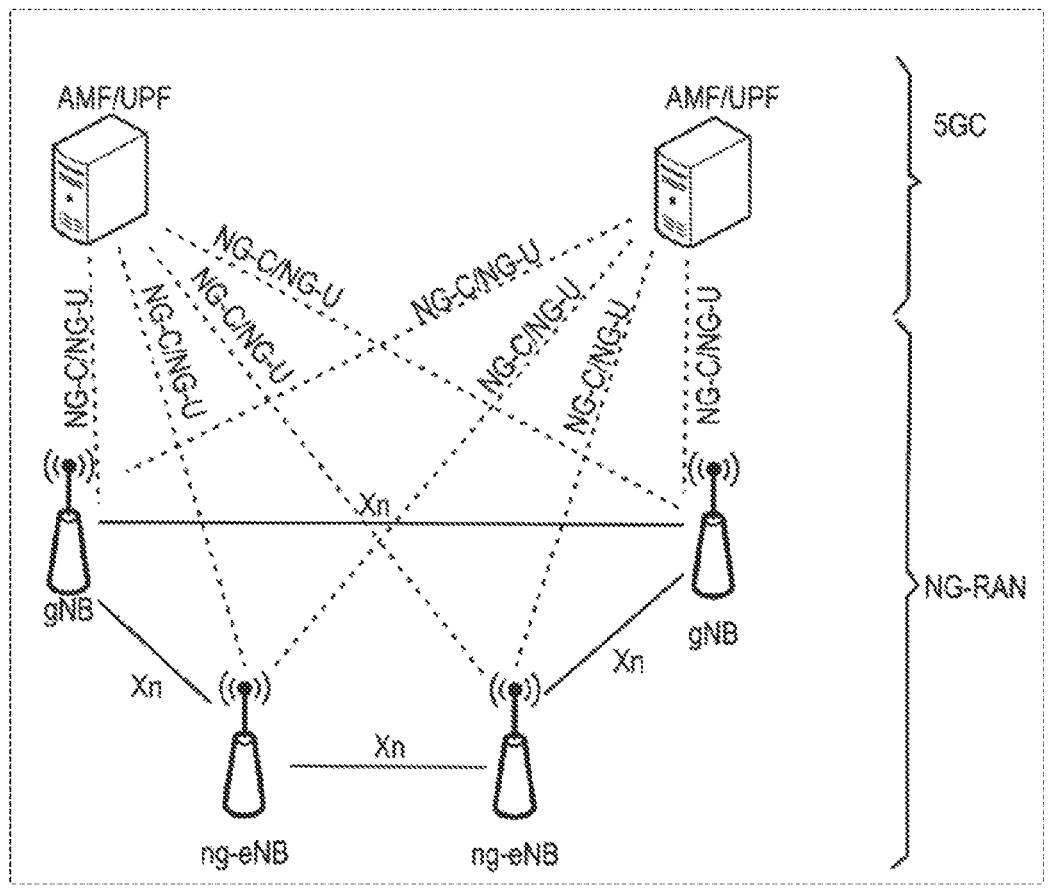
FIG. 20 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function)(e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 20 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP(see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 21:
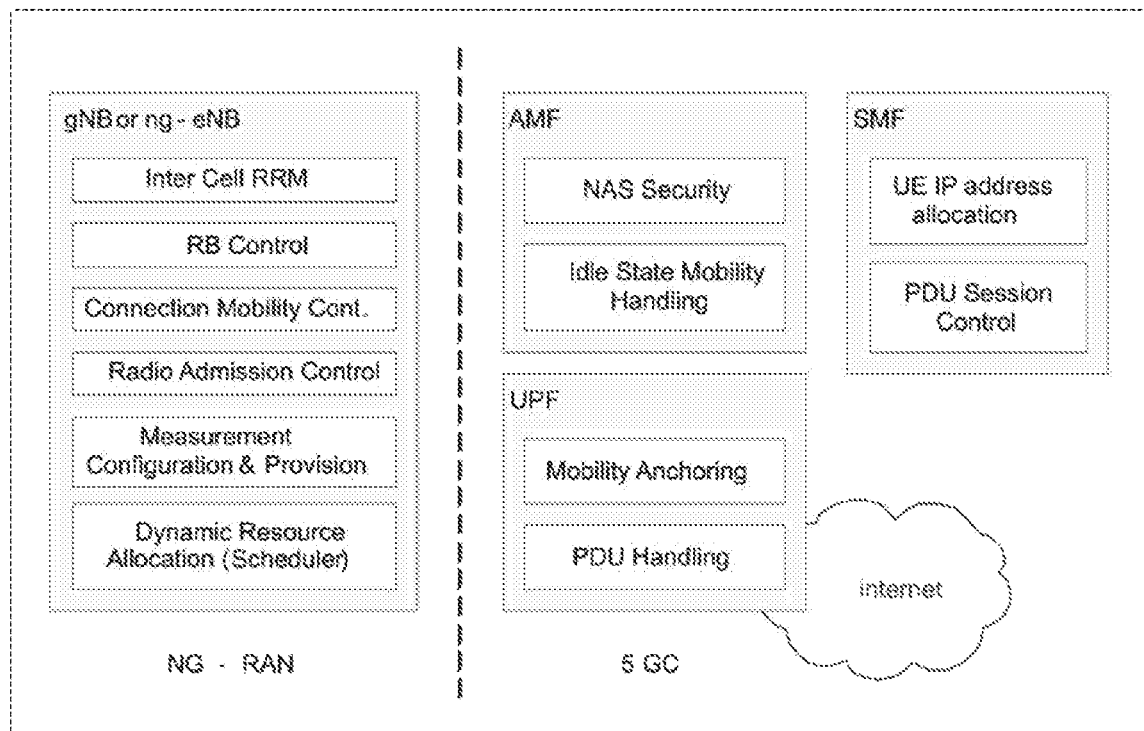
FIG. 21 schematically illustrates a functional split between Next Generation-Radio Access Network (NG-RAN) and 5th Generation Core (5GC)

FIG. 21 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:
  Radio Resource Management functions such as Radio Bearer Control, Radio Admission Control, Connection Mobility Control, and dynamic allocation (scheduling) of both uplink and downlink resources to a UE;
  IP header compression, encryption, and integrity protection of data:
  Selection of an AMF during UE attachment in such a case when no routing to an AMF can be determined from the information provided by the UE:
  Routing user plane data towards the UPF:
  Routing control plane information towards the AMF;

Connection setup and release:

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling:

Transport level packet marking in the uplink;

Session management;

Support of network slicing;

QoS flow management and mapping to data radio bearers;

Support of UEs in the RRC INACTIVE state;

Distribution function for NAS messages:

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable):

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session:

QoS handling for user plane (e.g., packet filtering, gating. UL/DL rate enforcement):

Uplink traffic verification (SDF to QoS flow mapping); and

Function of downlink packet buffering and downlink data indication triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination:

Control part of policy enforcement and QoS; and

Downlink data indication.

<RRC Connection Setup and Reconfiguration Procedure>

Figure 22:
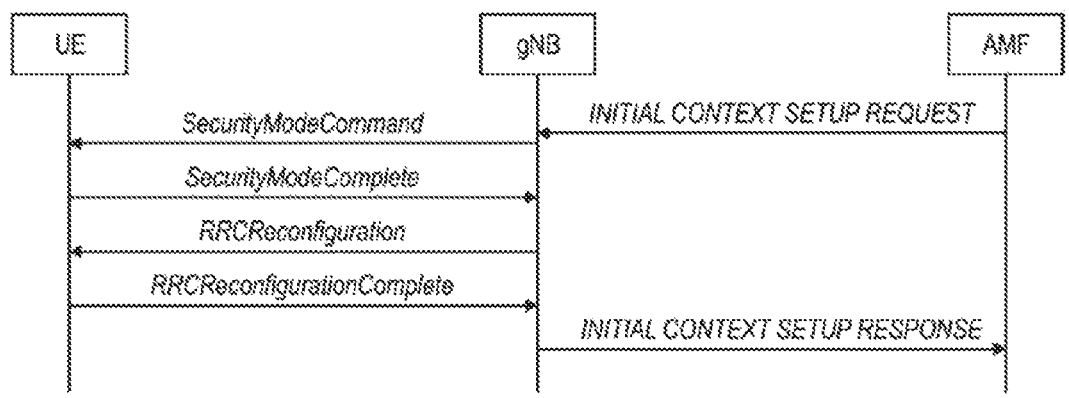
FIG. 22 is a sequence diagram of a Radio Resource Control (RRC) connection setup/reconfiguration procedure.

FIG. 22 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB indicates the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 23:
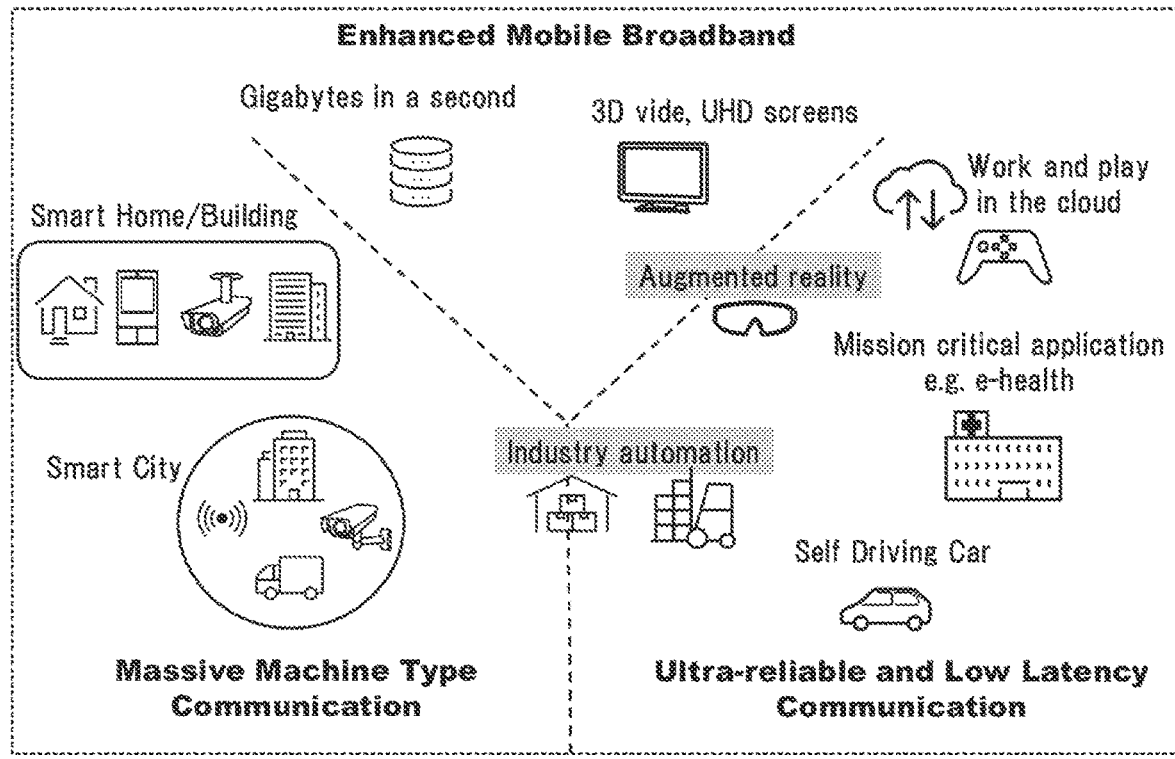
FIG. 23 schematically illustrates usage scenarios of enhanced Mobile BroadBand (eMBB), massive Machine Type Communications (mMTC), and Ultra Reliable and Low Latency Communications (URLLC)

FIG. 23 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 23 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few µs (where the value can be one or a few µs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 22. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 24:
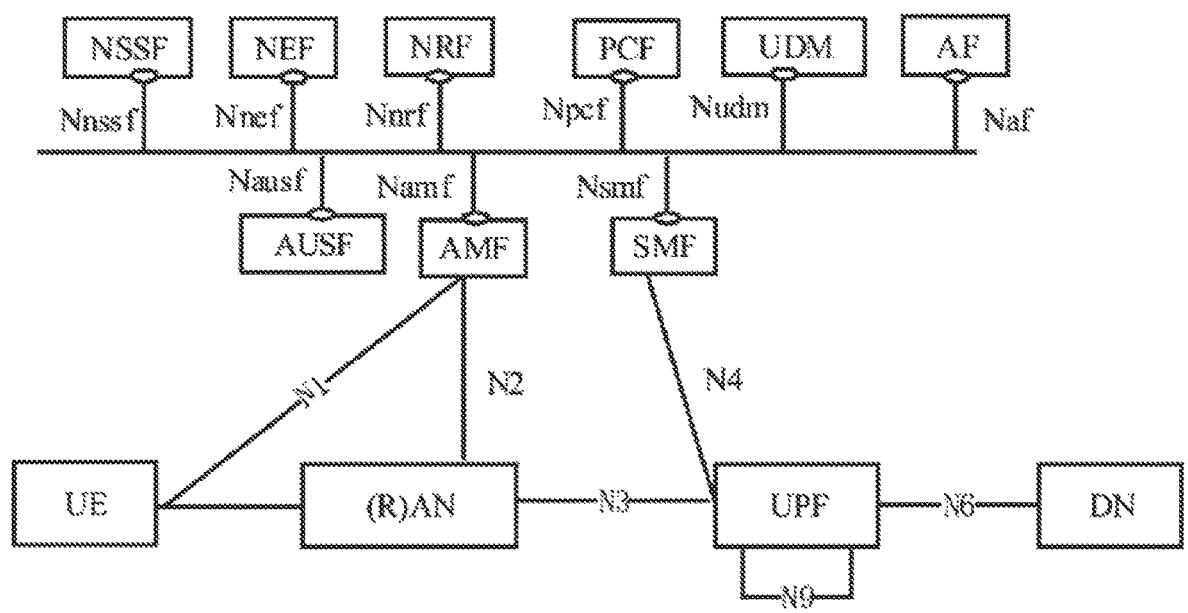
FIG. 24 is a block diagram illustrating an exemplary 5G system architecture for a non-roaming scenario.

FIG. 24 illustrates a 5G NR non-roaming reference architecture (see TS 23.501 v16.1.0, section 4.23). An Application Function (AF) (e.g., an external application server hosting 5G services, exemplarily described in FIG. 23) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 24 illustrates further functional units of the 5G architecture, namely Network Slice Selection Function (NSSF), Network Repository Function (NRF). Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: control circuitry, which, in operation, controls an allocation of an uplink resource with respect to uplink control information based on a size of information indicating a resource allocation relating to the uplink control information; and transmission circuitry, which, in operation, transmits the uplink control information in the uplink resource.

In an exemplary embodiment of the present disclosure, a mapping between a value of the information indicating the resource allocation and a candidate resource for the resource allocation differs depending on the size.

In an exemplary embodiment of the present disclosure, in the mapping, a number of a plurality of the candidate resources to be mapped to each value of the information indicating the resource allocation is different for each size.

In an exemplary embodiment of the present disclosure, a mapping between a combination of a value of the information indicating the resource allocation and a downlink resource used for transmission of the information indicating the resource allocation, and a candidate resource for the resource allocation differs depending on the size.

In an exemplary embodiment of the present disclosure, in the mapping, a number of a plurality of the downlink resources to be mapped to a plurality of the candidate resources in a one-to-one manner is different for each size.

In an exemplary embodiment of the present disclosure, the control circuitry determines a method for the allocation according to a comparison between a number of candidate resources for the resource allocation and a threshold value based on the size.

In an exemplary embodiment of the present disclosure, in a case where the number of candidate resources is equal to or less than the threshold value, the control circuitry determines, among the candidate resources, an uplink resource mapped to a value of the information indicating the resource allocation in a one-to-one manner, as an allocation resource for the uplink control information.

In an exemplary embodiment of the present disclosure, in a case where the number of candidate resources is greater than the threshold value, the control circuitry determines, among the candidate resources, a resource mapped to a combination of the information indicating the resource allocation and a downlink resource used for transmission of the information indicating the resource allocation, as an allocation resource for the uplink control information.

In an exemplary embodiment of the present disclosure, reception circuitry, which, in operation, receives information on the size is further included.

In an exemplary embodiment of the present disclosure, information on the size is information indicating a number of variable bits.

A communication method according to an exemplary embodiment of the present disclosure includes: controlling, by a terminal, an allocation of an uplink resource with respect to uplink control information based on a size of information indicating a resource allocation relating to the uplink control information, and transmitting, by the terminal, the uplink control information in the uplink resource.

The disclosure of Japanese Patent Application No. 2020-017987, filed on Feb. 5, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 205 Controller
102 Higher-layer control signal generator
103 Downlink control information generator 104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:

1. A terminal, comprising:
control circuitry, which, in operation, controls an allocation of a resource relating to uplink control information based on a size of information indicating the resource relating to the uplink control information; and
transmission circuitry, which, in operation, transmits the uplink control information in the resource,
wherein a mapping between values of the information indicating the resource and candidate resources for the resource differs depending on the size, and
wherein in a case a number of the candidate resources is larger than a threshold value, the number of the candidate resources relating to one of the values of the information indicating the resource is the same, regardless of the size of the information indicating the resource.

2. The terminal according to claim 1, wherein, regardless of whether a number of the values of the information indicating the resource equals the threshold value, the values of the information indicating the resource are related to the candidate resources in a one-to-one manner in a case the number of the candidate resources is equal to or less than the threshold value.

3. The terminal according to claim 2, wherein, the threshold value is 8, and the size of the information indicating the resource is 0, 1, 2 or 3 bits.

4. The terminal according to claim 1, wherein a mapping between a combination of a value of the information indicating the resource and a downlink resource used for transmission of the information indicating the resource, and a candidate resource for the resource, differs depending on the size.

5. The terminal according to claim 1, further comprising reception circuitry, which, in operation, receives information on the size.

6. The terminal according to claim 5, wherein the information on the size is information indicating a number of variable bits.

7. The terminal according to claim 1, wherein information relating to candidate resources for the resource is indicated by a user dedicated higher layer signaling.

8. The terminal according to claim 1, wherein information indicating the resource relating to the uplink control information is indicated by downlink control information.

9. A communication method, comprising:
controlling an allocation of a resource relating to uplink control information based on a size of information indicating the resource relating to the uplink control information; and
transmitting the uplink control information in the resource,
wherein a mapping between values of the information indicating the resource and candidate resources for the resource differs depending on the size, and
wherein in a case a number of the candidate resources is larger than a threshold value, the number of the candidate resources relating to one of the values of the information indicating the resource is the same, regardless of the size of the information indicating the resource.

10. The communication method according to claim 9, wherein, regardless of whether a number of the values of the information indicating the resource equals the threshold value, the values of the information indicating the resource are related to the candidate resources in a one-to-one manner in a case the number of the candidate resources is equal to or less than the threshold value.

11. The communication method according to claim 10, wherein, the threshold value is 8, and the size of the information indicating the resource is 0, 1, 2 or 3 bits.

12. The communication method according to claim 9, wherein a mapping between a combination of a value of the information indicating the resource and a downlink resource used for transmission of the information indicating the resource, and a candidate resource for the resource, differs depending on the size.

13. The communication method according to claim 9, further comprising:
receiving information on the size.

14. The communication method according to claim 13, wherein the information on the size is information indicating a number of variable bits.

15. The communication method according to claim 9, wherein information relating to the candidate resources for the resource is indicated by a user dedicated higher layer signaling.

16. The communication method according to claim 9, wherein information indicating the resource relating to the uplink control information is indicated by downlink control information.

* * * * *